(12) United States Patent
Nishikawa et al.

(10) Patent No.: US 7,116,498 B2
(45) Date of Patent: Oct. 3, 2006

(54) PROJECTION OPTICAL SYSTEM AND IMAGE PROJECTION APPARATUS

(75) Inventors: Jun Nishikawa, Tokyo (JP); Nobuhiko Nishiki, Kanagawa (JP); Yasunori Kuratomi, Kanagawa (JP); Tetsuya Kita, Kanagawa (JP); Takaaki Iwaki, Tokyo (JP)

(73) Assignee: Sony Corporation, (JP)

( * ) Notice: Subject to any disclaimer, the term of this patent is extended or adjusted under 35 U.S.C. 154(b) by 102 days.

(21) Appl. No.: 11/073,973

(22) Filed: Mar. 7, 2005

(65) Prior Publication Data

US 2005/0200974 A1   Sep. 15, 2005

(30) Foreign Application Priority Data

Mar. 12, 2004 (JP) .......................... P2004-071257

(51) Int. Cl.
*G02B 13/04* (2006.01)
(52) U.S. Cl. ...................... 359/749; 359/680; 359/691; 359/725
(58) Field of Classification Search ................ 359/680, 359/691, 749–753, 725
See application file for complete search history.

(56) References Cited

U.S. PATENT DOCUMENTS

| 5,042,929 A | * | 8/1991 | Tanaka et al. ............... 359/708 |
| 5,390,048 A | * | 2/1995 | Miyatake et al. ........... 359/650 |
| 6,144,503 A | * | 11/2000 | Sugano ....................... 359/749 |

\* cited by examiner

*Primary Examiner*—Scott J. Sugarman
*Assistant Examiner*—Darryl J. Collins
(74) *Attorney, Agent, or Firm*—Lerner, David, Littenberg, Krumholz & Mentlik, LLP

(57) ABSTRACT

A projection optical system and an image projection apparatus that are small in size and can achieve projection with a wide angle while a good image forming performance is assured includes a first lens group having a negative refracting power and a second lens group also having a negative refracting power. The first and second lens groups are arranged in order from the projection side. The first lens group includes a negative meniscus lens that has a concave surface directed to the projection side and formed as an aspherical reflecting surface.

18 Claims, 19 Drawing Sheets

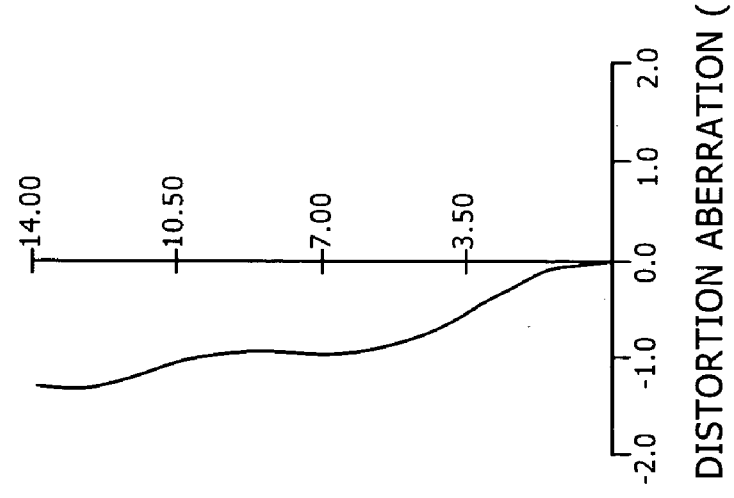
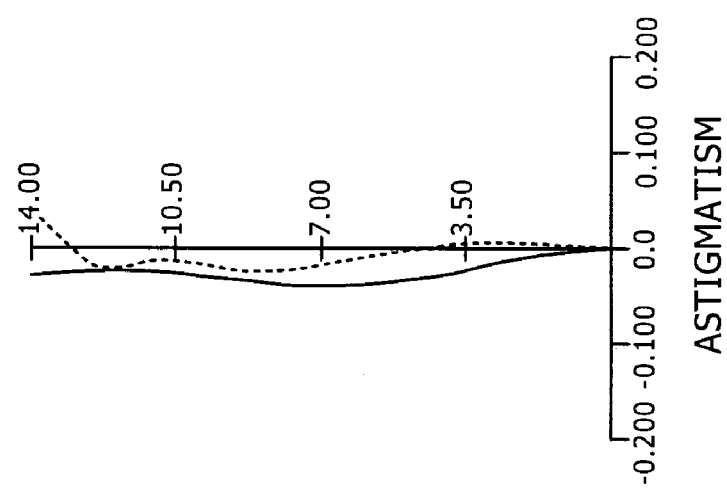
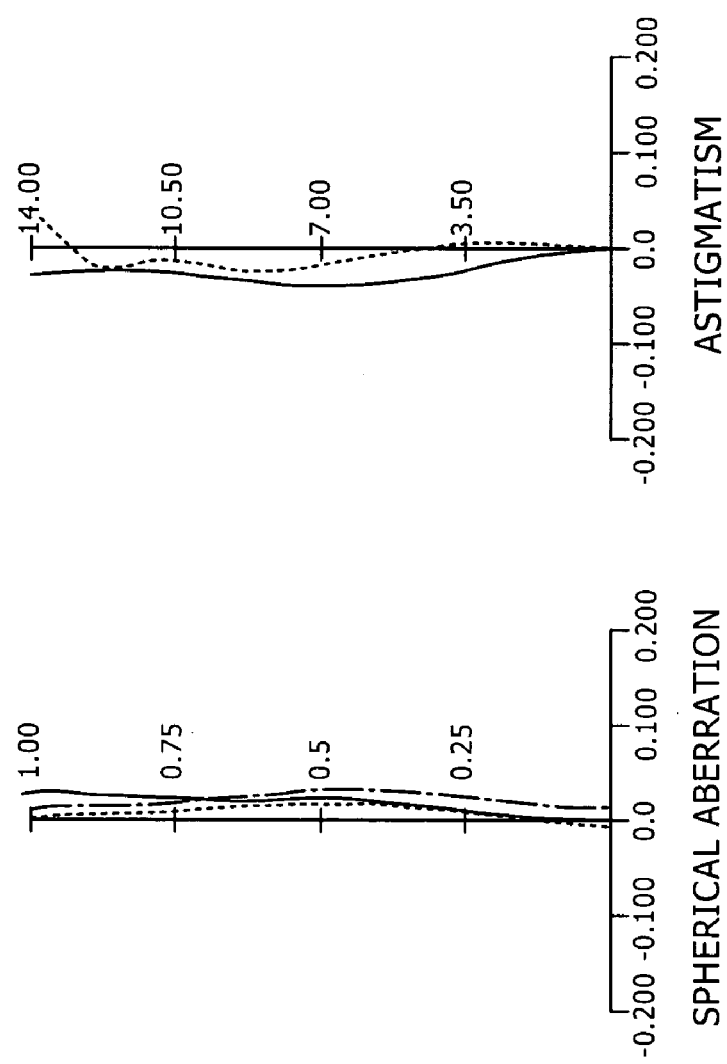

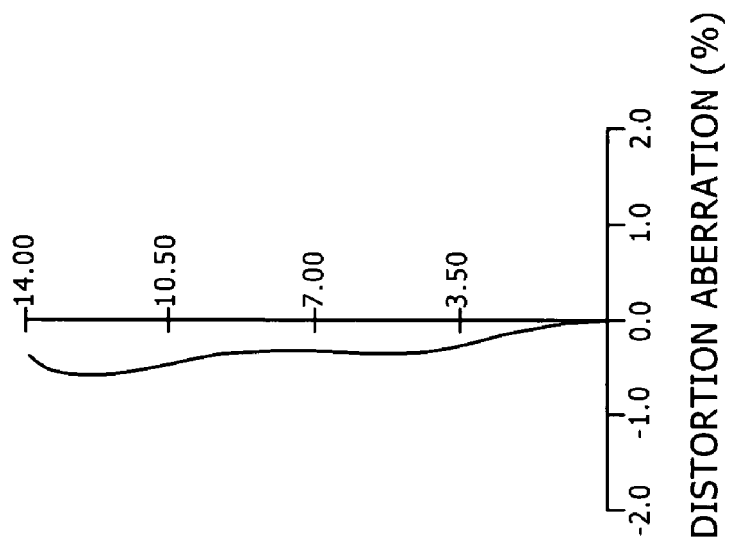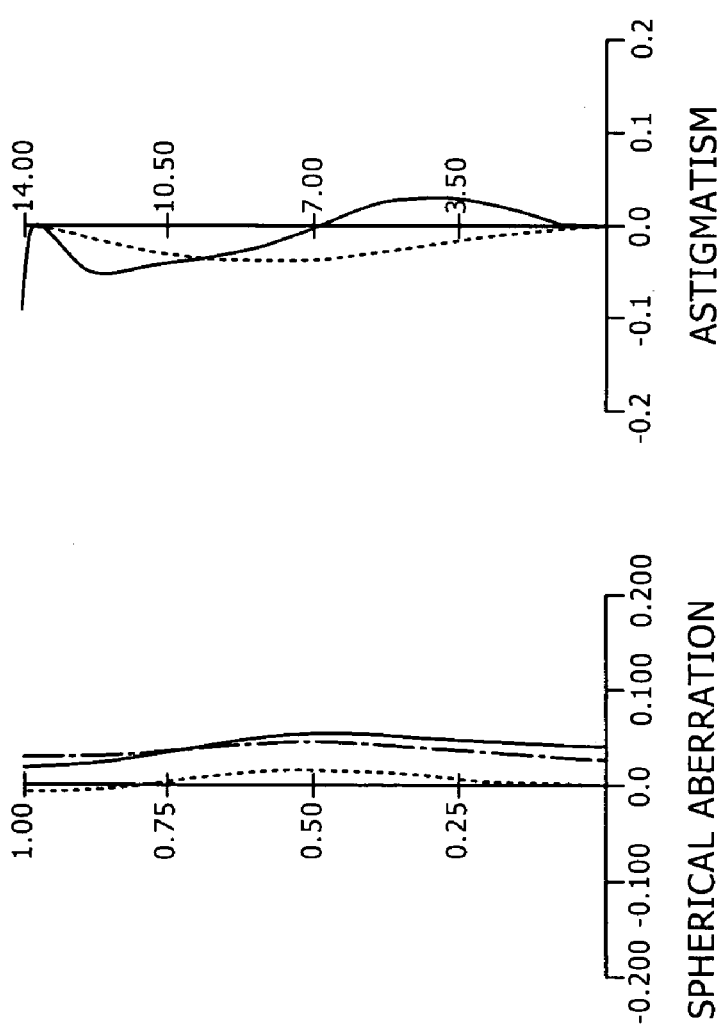
FIG. 4A   FIG. 4B   FIG. 4C

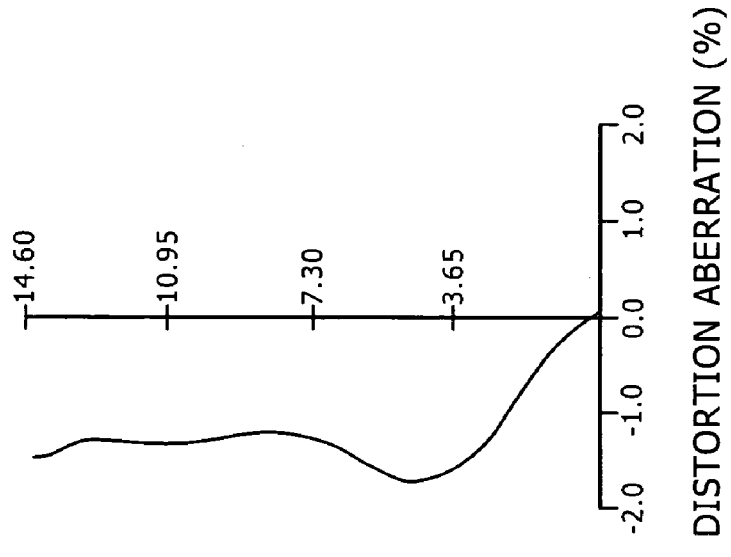
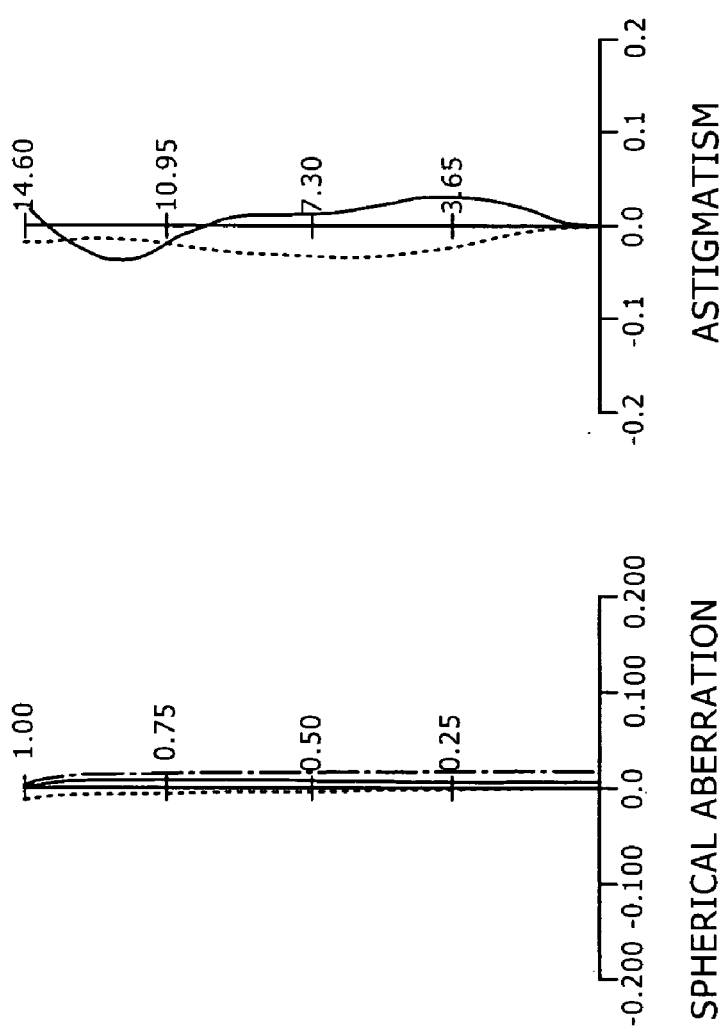

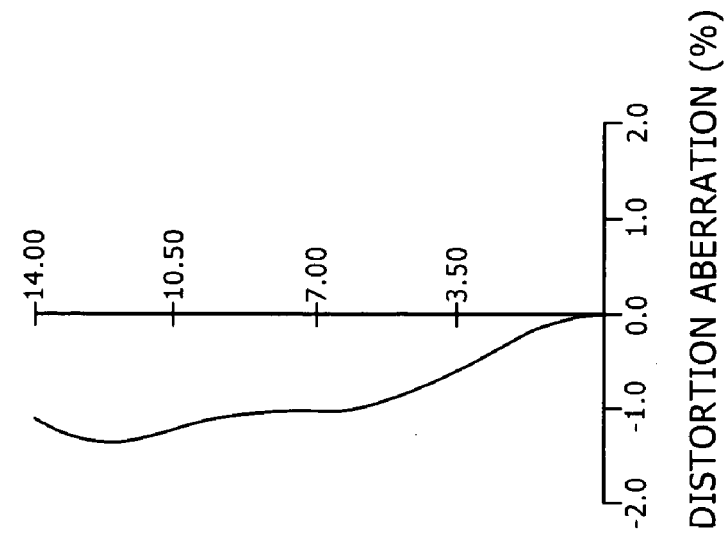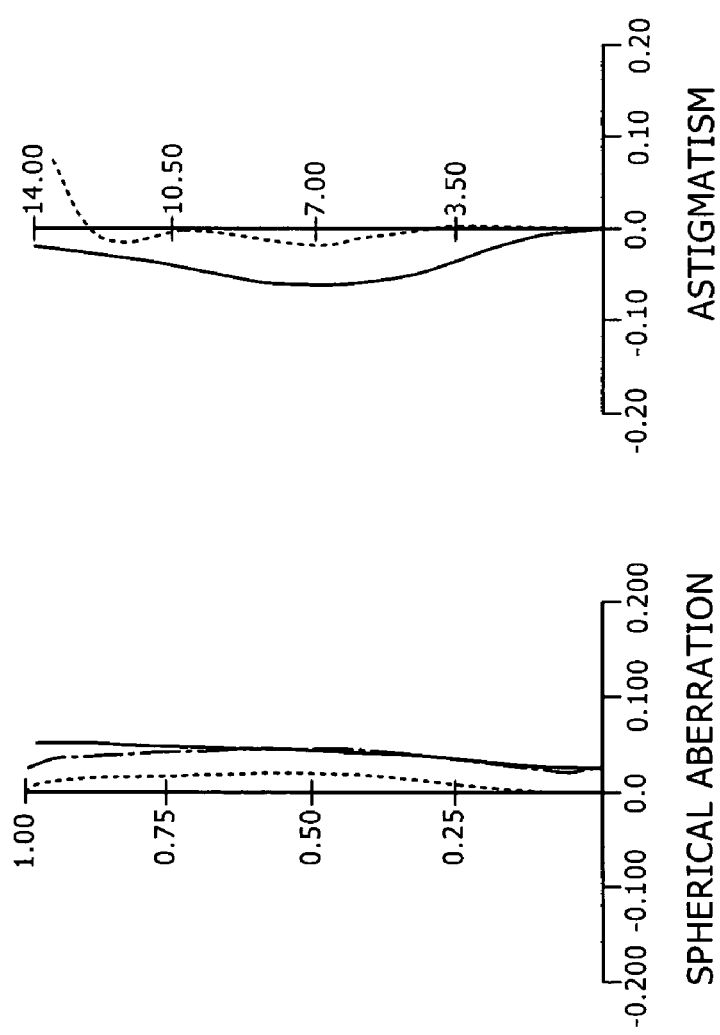

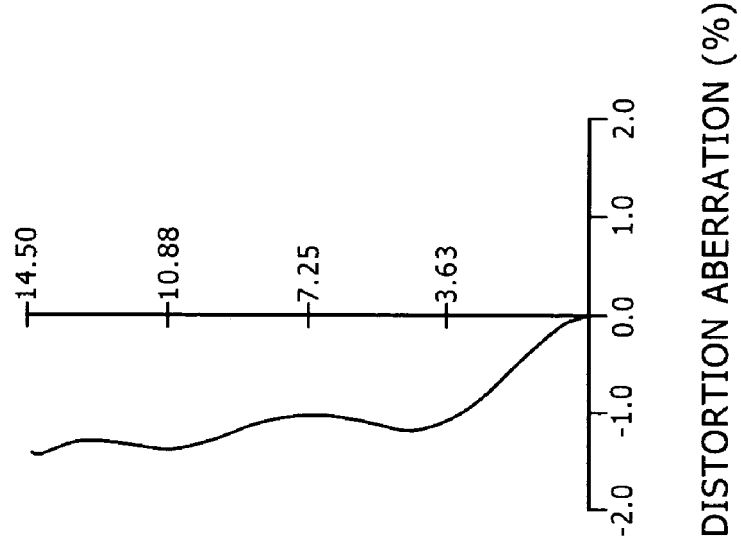
FIG. 10A  FIG. 10B  FIG. 10C
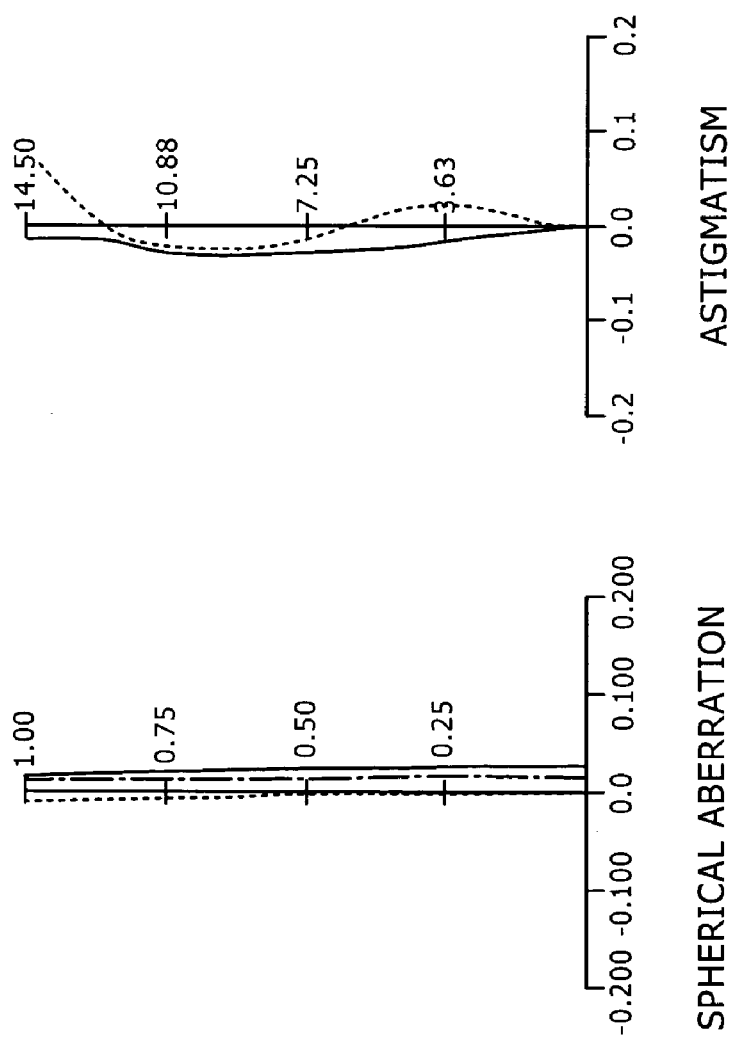

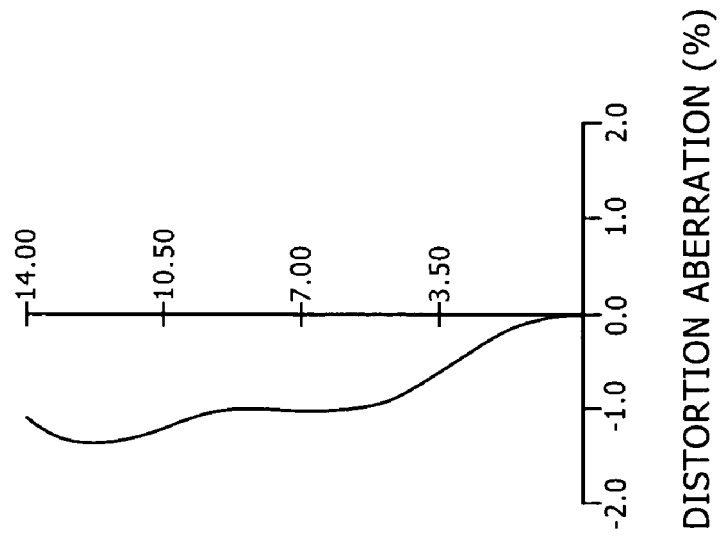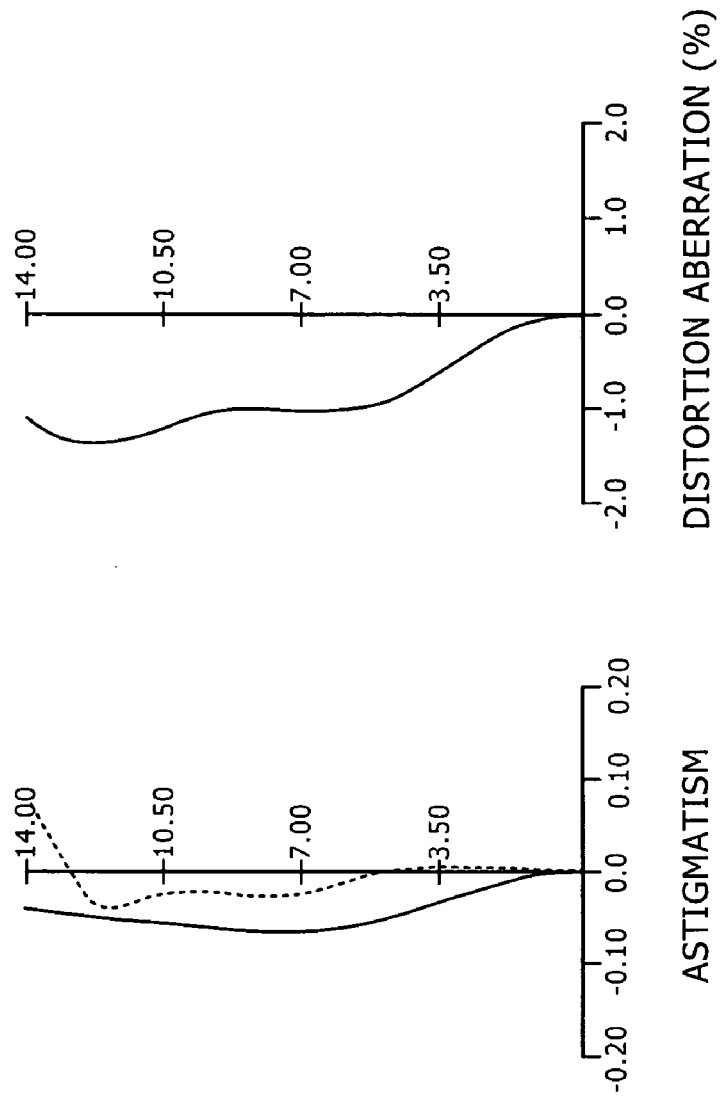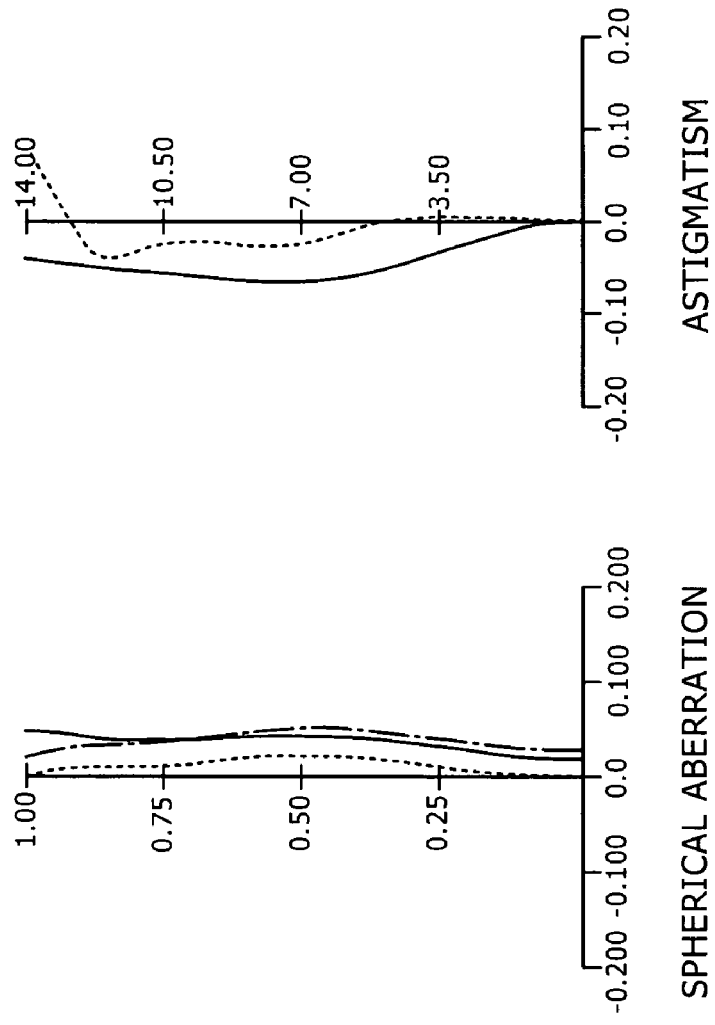

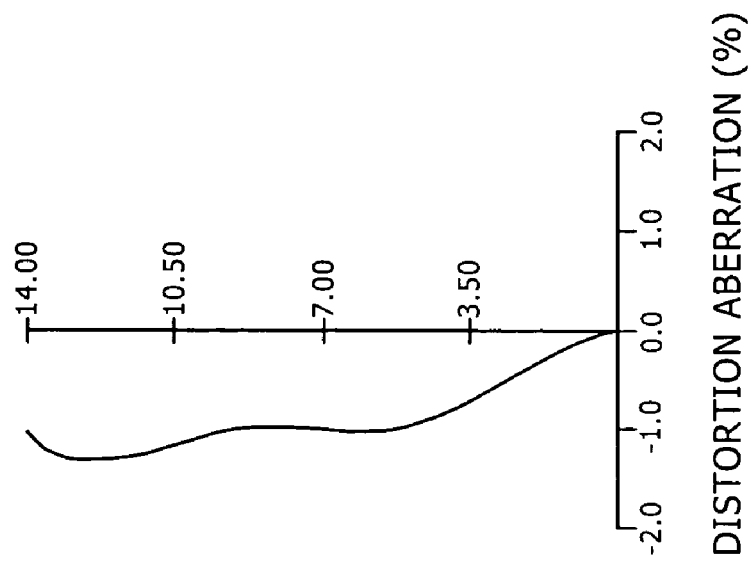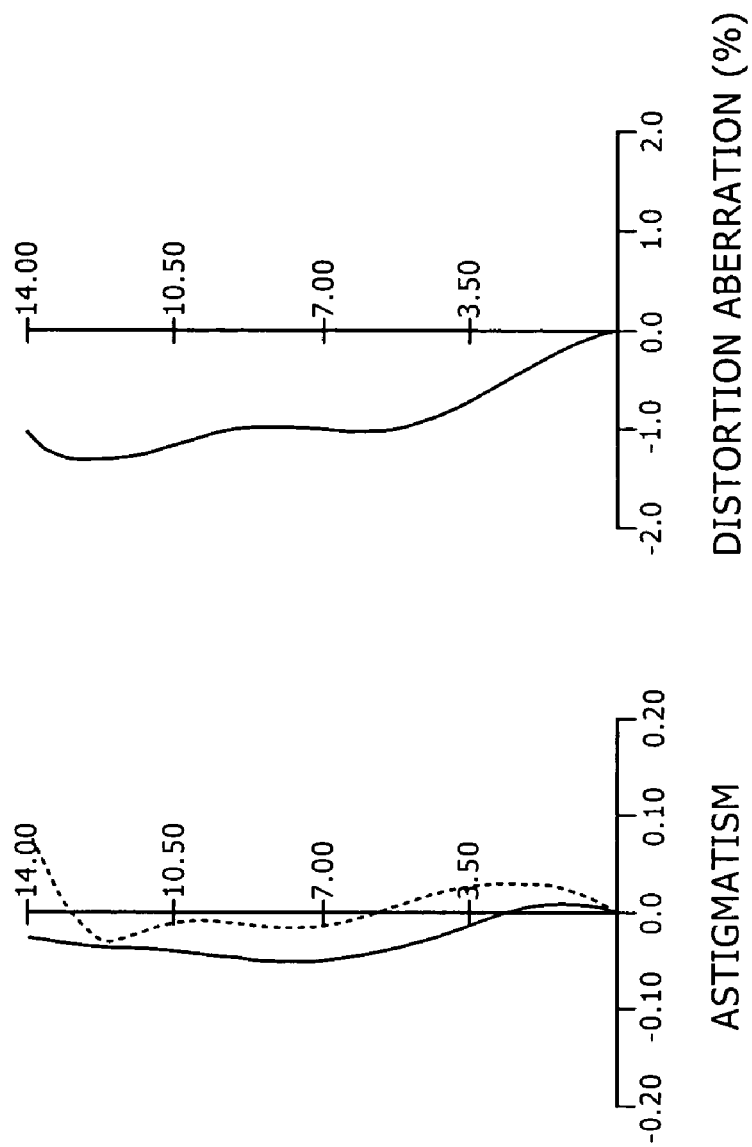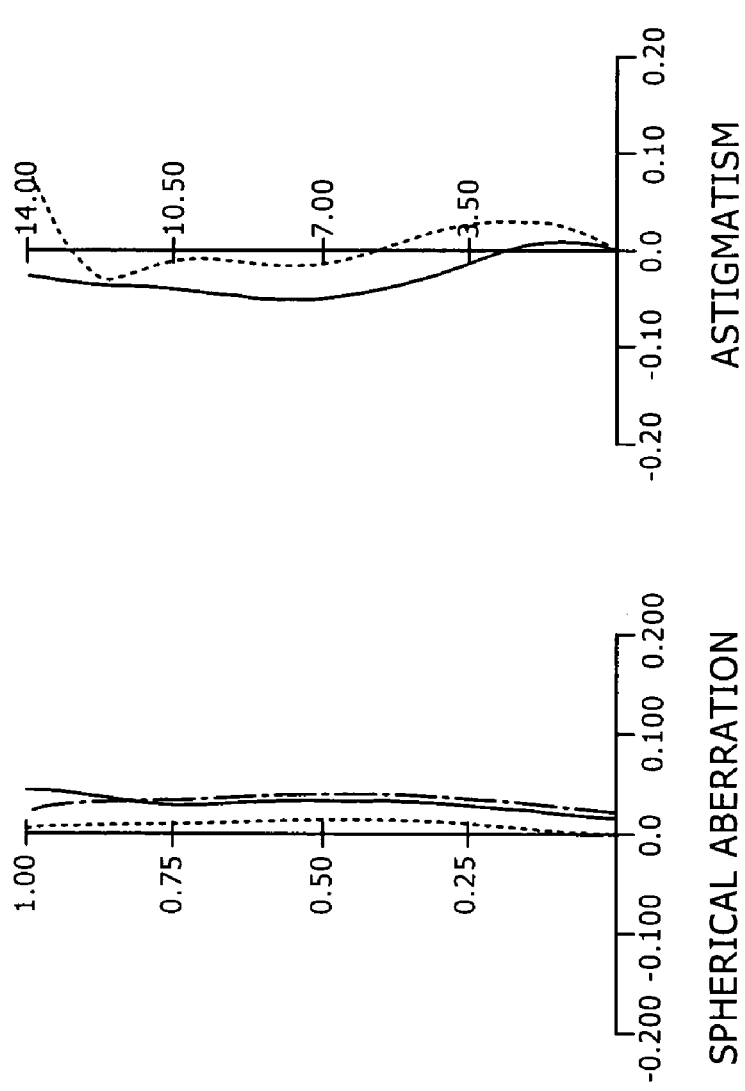

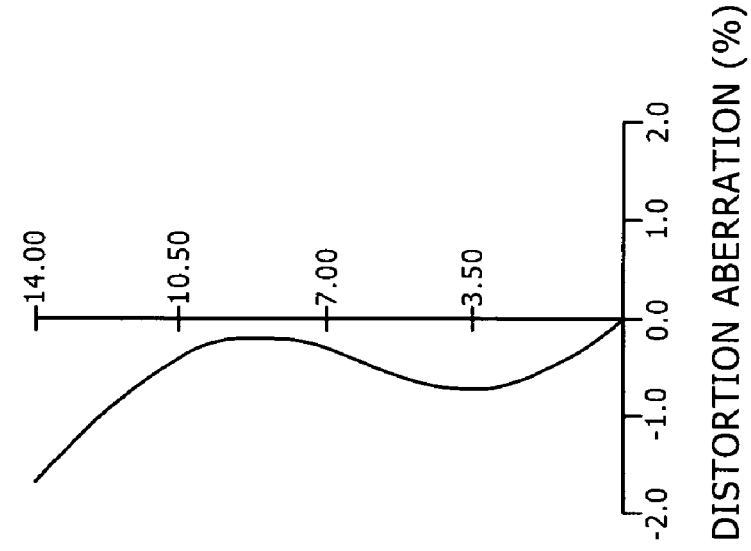
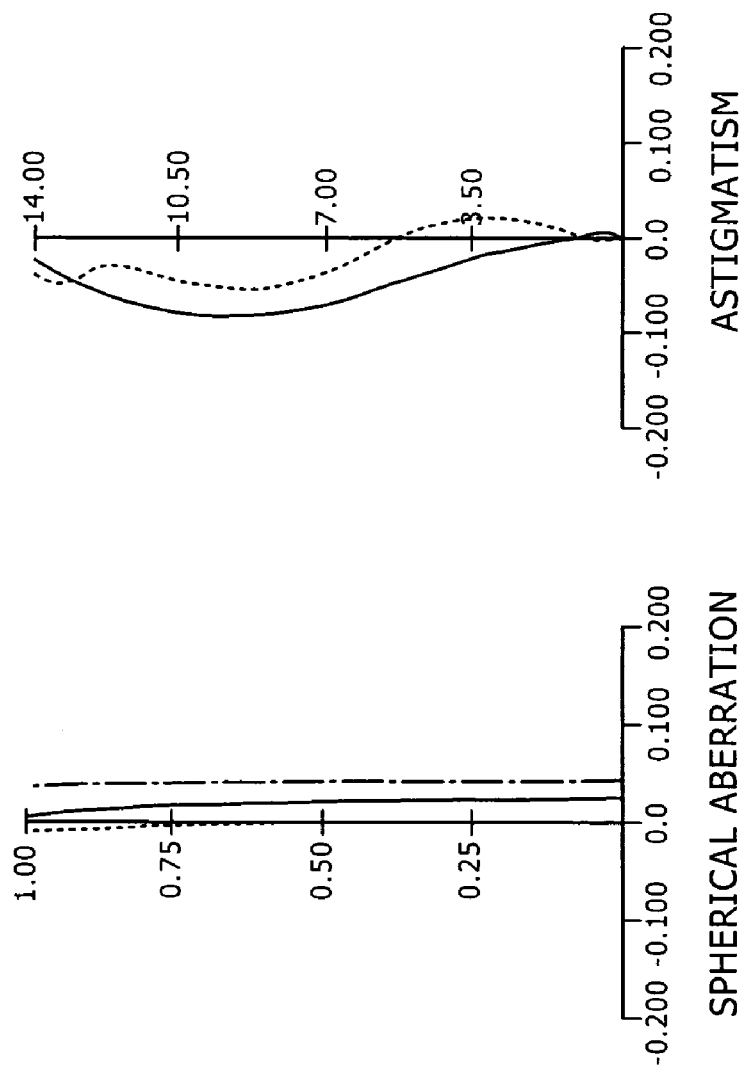
FIG.16A  FIG.16B  FIG.16C

PROJECTION OPTICAL SYSTEM AND IMAGE PROJECTION APPARATUS

BACKGROUND OF THE INVENTION

This invention relates to a projection optical system and an image projection apparatus, and more particularly to a technique for a projection optical system and an image projection apparatus which achieves projection with a wide angle and with a good image forming performance and allows reduction in size.

In recent years, it is demanded to make it possible for a projection optical system to project an image with a widened angle. Where the projection optical system is applied to an image projection apparatus, widening of the angle makes it possible for a rear projection television set, that is, an apparatus which projects an image from the back of a transmission type screen so that the image may be enjoyed from the front, to project an image on a screen of an increased size while decreasing the distance between the screen and the projection optical system. Consequently, widening of the angle provides an advantage that miniaturization, particularly reduction in size in the depthwise direction, of the apparatus of the type described can be achieved. On the other hand, widening of the angle makes it possible for a front projector, that is, an apparatus which projects an image on a reflection type screen such that the image is enjoyed from the image projection apparatus side, to project an image on a screen of an increased size even at a place where a great distance cannot be assured between the screen and the image projection apparatus. Consequently, widening of the angle provides an advantage that the spatial restriction to the place for the watching the image is comparatively small.

As one of projection optical systems which have achieved widening of the angle, a projection optical system which includes a combination of an aspherical mirror and a diffractive optical system and another projection optical system which includes a combination of a plurality of aspherical and spherical mirrors are disclosed in the published Japanese translation of PCT international publication for a patent application No. W001/006295 (hereinafter referred to as Patent Document 1). Meanwhile, another projection optical system which includes a combination of an aspherical mirror and a refractive optical system is disclosed in Japanese Patent Laid-Open No. 2002-207168 (hereinafter referred to as Patent Document 2). A further projection optical system which includes four aspherical mirrors is disclosed in Japanese Patent Laid-Open No. 2003-177320 (hereinafter referred to as Patent Document 3).

Incidentally, in a projection optical system which includes a combination of a single aspherical mirror and a refractive optical system as in the conventional projection optical system described hereinabove, it is easy to eliminate the chromatic aberration and widen the angle when compared with an alternative apparatus which is composed only of a refractive optical system. On the other hand, since the single aspherical mirror takes charge of almost all of a diverging action, the aberration generation amount of the distortion, curvature of field and so forth is so great that it is inclined to deteriorate the picture quality. Therefore, in order to appropriately correct the distortion aberration or the curvature of field, the refracting power of the aspherical mirror must be made moderate (the radius of curvature must be increased), which increases the scale of the aspherical mirror and hence increases the space for arrangement of the aspherical mirror. This signifies that, where the projection optical system described is applied, for example, a rear projection television set, a large space is required for a lower portion or an upper portion of the screen.

On the other hand, a projection optical system which uses a plurality of aspherical mirrors does not include a configuration of a refractive optical system, and therefore, it does not cause color aberration in principle and does not involve absorption by a lens at all either. However, since the projection optical system includes only mirrors, it is very susceptible to an error upon production and much time is required for adjustment. Therefore, the projection optical system of the type described is not suitable for an optical system for which mass productivity is required such as general television sets. Further, with the projection optical system disclosed in Paten Document 3, since four mirrors are disposed in a vertical direction, it is physically difficult to lower a lower portion or an upper portion of the screen.

SUMMARY OF THE INVENTION

It is an object of the present invention to provide a projection optical system and an image projection apparatus which are small in size and can achieve projection with a wide angle while a good image forming performance is assured.

In order to attain the object described above, according to an aspect of the present invention, there is provided a projection optical system of the retrofocus type, including a first lens group having a negative refracting power, and a second lens group having a negative refracting power, the first and second lens groups being arranged in order from the projection side, the first lens group including a negative meniscus lens which has a concave surface directed to the projection side and formed as an aspherical reflecting surface.

According to another aspect of the present invention, there is provided an image projection apparatus, including an image formation section for forming an image, and a projection optical system for projecting the image formed by the image formation section, the projection optical system being of the retrofocus type which includes a first lens group having a negative refracting power and a second lens group having a negative refracting power, the first and second lens groups being arranged in order from the projection side, the first lens group including a negative meniscus lens which has a concave surface directed to the projection side and formed as an aspherical reflecting surface.

With the projection optical system and the image projection apparatus, an image of a high picture quality with regard to which various aberrations have been corrected satisfactorily can be projected with a wide angle. Further, the projection optical system and the image projection apparatus can be configured in a small size.

More particularly, in the projection optical system and the image projection apparatus, a reflecting surface which takes charge of the last stage of a projection action and plays a principal roll in widening of the projection angle is formed as an aspheric concave surface of a negative meniscus lens having a refractive index n (>1) such that a flux of light to be projected passes through a convex refracting surface of the negative meniscus lens before and after reflection by the reflecting surface of the negative meniscus lens. Consequently, if the total refracting power by the negative meniscus lens is set equal to the refracting power which depends only upon the reflecting surface, or in other words, if the diversion of a flux of light is set equal, the radius of curvature of the negative meniscus lens can be increased by an amount corresponding to the refractive index n. Therefore, where the wide angle is equal, the aberration generation amount can be reduced to approximately two thirds when compared with that by an alternative configuration wherein a flux of light at the last stage is diverged only by means of a mirror, and consequently, an image can be projected with a high picture quality with reduced distortion. Further, this makes it possible to achieve reduction of the diameter of the aspherical reflecting surface and reduce the sag amount, and consequently, miniaturization can be achieved.

Preferably, the projection optical system further includes a third lens group having a positive refracting power and a fourth lens group having a positive refracting power, the third and fourth lens groups being disposed in order toward the image side on the image side with respect to the second lens group, the first to fourth lens groups satisfying the conditional expressions (1) $0.02 < f(\text{all}) \cdot |\phi 1| < 0.3$, (2) $3.0 < \phi 12/\phi 34 < 20$, (3) $-2.0 < f(\text{all}) \cdot \phi 12 < -0.2$, (4) $0.1 < \text{Tmax}/\text{T0} < 5.0$ and (5) $-30 < kr < 0$, where $f(\text{all})$ is the focal length of the entire system, $\phi 1$ the refracting power of the first lens group, $\phi 2$ the refracting power of the second lens group, $\phi 12$ the composite refracting power of the first and second lens groups, $\phi 34$ the composite refracting power of the third and fourth lens groups, Tmax the thickness of the negative meniscus lens at a maximum image height in a direction parallel to an optical axis, T0 the thickness of the negative meniscus lens on the axis, and kr the aspheric conical constant of the reflecting surface. With the projection optical system, correction of various aberrations can be performed further satisfactorily. Particularly, correction of aberrations of the distortion and the curvature of field can be performed appropriately.

Preferably, the negative meniscus lens which composes the first lens group has an aspheric refracting surface and satisfies the conditional expression (6) $-15.0 < kt < 15.0$ where kt is the aspheric conical constant of the refracting surface. With the projection optical system, correction of the distortion aberration and the curvature of field can be performed further appropriately.

Preferably, the aspherical reflecting surface of the negative meniscus lens of the first lens group includes a term of an odd-numbered order which satisfies the conditional expression (7) $0.0 < A3R < 1.0 \times 10^{-12}$ where A3R is the third order aspheric coefficient of the reflecting surface of the negative meniscus lens. With the projection optical system, aberration correction of the distortion aberration, curvature of field and so forth is facilitated.

Preferably, the aspherical reflecting surface of the negative meniscus lens of the first lens group includes a term of an odd-numbered order which satisfies the conditional expression (8) $0.0 < A3T < 1.0 \times 10^{-12}$ where A3T is the third order aspheric coefficient of the refracting surface of the negative meniscus lens. Also with the projection optical system, aberration correction of the distortion aberration, curvature of field and so forth is facilitated.

Preferably, at least one of faces of a lens or lenses which compose the second lens group is formed from an aspheric surface. With the projection optical system, satisfactory aberration correction can be anticipated and the number of lenses can be reduced.

Alternatively, at least one of faces of a lens or lenses which compose the second lens group may be formed from an aspheric surface including a term of an odd-numbered order. Also with the projection optical system, satisfactory aberration correction can be anticipated and the number of lenses can be reduced.

Preferably, at least one of faces of a lens or lenses which compose the fourth lens group is formed from an aspheric surface. Also with the projection optical system, satisfactory aberration correction can be anticipated and the number of lenses can be reduced.

Preferably, the fourth lens group includes at least one positive lens which satisfies the conditional expressions (9) $0.7 < \Delta P < 6.0$ and (10) $60 < \nu(\text{convex}) < 100$ where $\Delta P = \{\Theta - (0.6444 - 0.001689 \cdot \nu(\text{convex}))\} \times 100$ and $\Theta = (ng - nF)/(nF - nC)$, where $\nu(\text{convex})$ is the Abbe number of the positive lens at the d-line of the wavelength of 587.6 nm, ng the refractive index of the positive lens at the g-line of the wavelength of 435.84 nm, nF the refractive index of the positive lens at the F-line of the wavelength of 486.13 nm, and nC the refractive index of the positive lens at the C-line of the wavelength of 656.28 nm. With the projection optical system, correction of the color aberration can be performed satisfactorily.

Preferably, the projection optical system further includes a light path bending unit interposed between the first and second lens groups or at a suitable position on the image side with respect to the second lens group for bending the light path. With the projection optical system, reduction in size of the projection optical system in the depthwise direction can be anticipated.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A to 2C are diagrammatic views illustrating a spherical aberration, astigmatism and distortion aberration of the lens system of FIG. 1;

FIGS. 4A to 4C are diagrammatic views illustrating a spherical aberration, astigmatism and distortion aberration of the lens system of FIG. 3;

FIGS. 6A to 6C are diagrammatic views illustrating a spherical aberration, astigmatism and distortion aberration of the lens system of FIG. 5;

FIGS. 8A to 8C are diagrammatic views illustrating a spherical aberration, astigmatism and distortion aberration of the lens system of FIG. 7;

FIGS. 10A to 10C are diagrammatic views illustrating a spherical aberration, astigmatism and distortion aberration of the lens system of FIG. 9;

FIGS. 12A to 12C are diagrammatic views illustrating a spherical aberration, astigmatism and distortion aberration of the lens system of FIG. 11;

FIGS. 14 to 14C are diagrammatic views illustrating a spherical aberration, astigmatism and distortion aberration of the lens system of FIG. 13;

FIGS. 16A to 16C are diagrammatic views illustrating a spherical aberration, astigmatism and distortion aberration of the lens system of FIG. 15;

DESCRIPTION OF THE PREFERRED EMBODIMENTS

Figure 1:
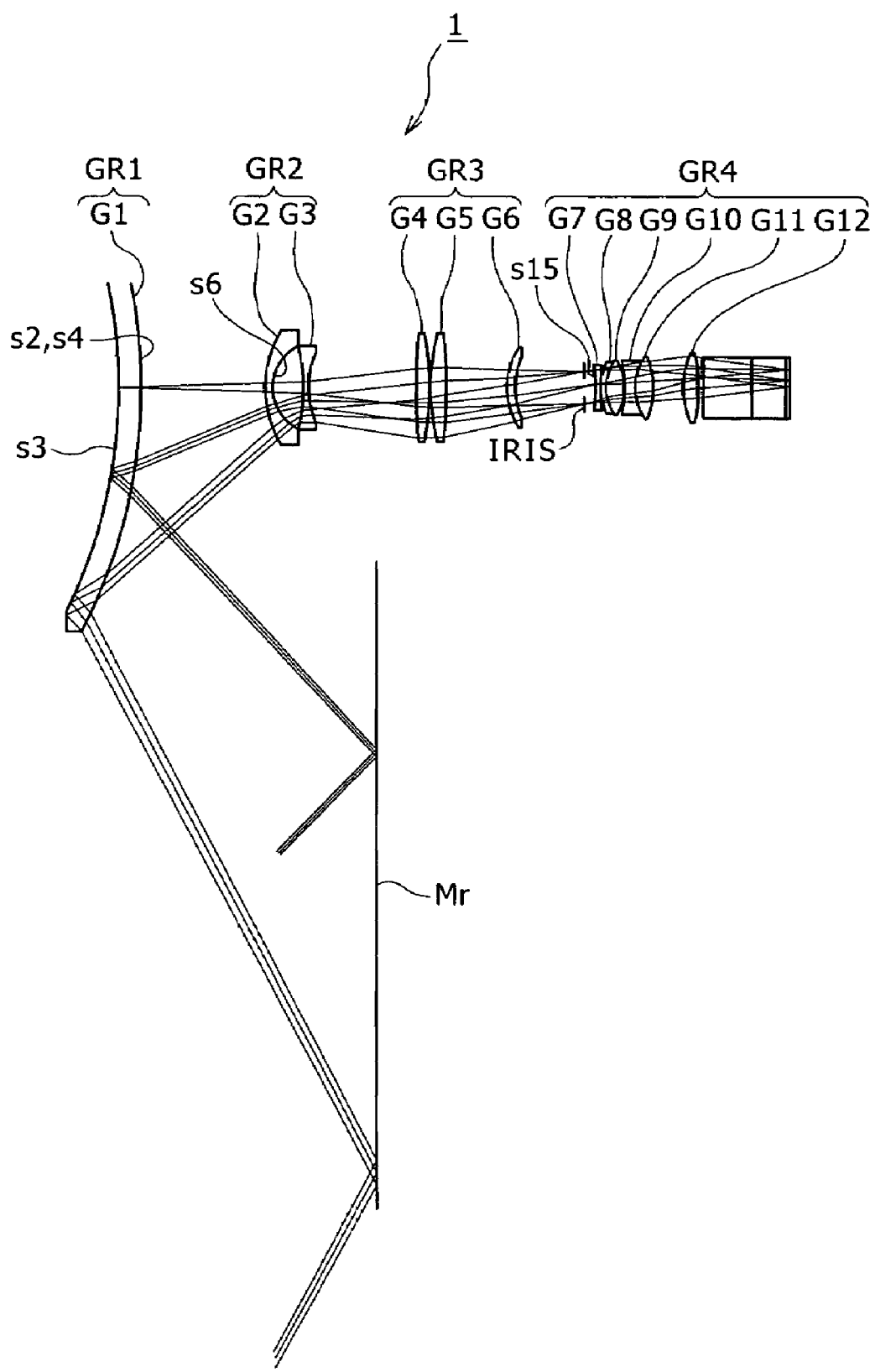
FIG. 1 is a schematic view showing a lens system of a projection optical system according to a first embodiment of the present invention.

In the following, the present invention is described in detail in connection with preferred embodiments thereof shown in the accompanying drawings.

A projection optical system of the present invention is formed as a projection optical system of the retrofocus type which includes a first lens group GR1 having a negative refracting power and a second lens group GR2 having a negative refracting power. The first and second lens groups GR1 and GR2 are arranged in order from the projection side. The first lens group GR1 includes a negative meniscus lens G1 which has a concave surface s3 directed to the projection side and formed as an aspherical reflecting surface.

As described hereinabove, widening of the angle of a conventional projection optical system which includes a combination of an aspherical mirror and a refracting optical system or includes a combination of a plurality of aspherical mirrors is achieved by providing most of a factor like a field compressor principally to one face of an aspherical mirror on the most projection side (object side). However, where the arrangement described is used, since the refracting power for widening the angle is taken charge of only by one reflecting surface, there is a tendency that the aberration generation amount of the distortion or the curvature of field is so great that it deteriorates the image quality.

According to the present invention, in order to suppress the aberration generation amount, the aspherical mirror on the projection side is replaced by the negative meniscus lens G1 having a refractive index n (>1) and the concave surface s3 having an aspheric surface is formed as a reflecting surface to overcome the problem of the conventional projection optical systems.

While the focal length f of the mirror is represented by f=−r/2, where it has the refractive index n and has a reflecting surface on the rear surface side thereof, the focal length f is f=−r/2n. In other words, if the refracting power of the reflecting surface is equal, then the radius r of curvature can be increased by an amount corresponding to the refractive index n. Consequently, also the aberration generation amount is reduced by approximately ⅔ when compared with that only the mirror is involved, and consequently, an optical system having a high picture quality with low distortion can be achieved. Further, this achieves reduction in diameter of the aspheric surface, and also reduction of the sag amount (in this instance, the height of the curved surface from an end portion of the mirror) can be anticipated. Thus, where the projection optical system of the present invention is applied, for example, to a rear projection television set, reduction in thickness of the rear production television set can be achieved.

The projection optical system of the present invention further includes a third lens group GR3 having a positive refracting power and a fourth lens group GR4 having a positive refracting power. The third and fourth lens groups GR3 and GR4 are disposed in order toward the image side on the image side with respect to the second lens group GR2. Where the focal length of the entire system is represented by f(all), the refracting power of the first lens group GR1 by φ1, the refracting power of the second lens group GR2 by φ2, the composite refracting power of the first and second lens groups GR1 and GR2 by φ12, the composite refracting power of the third and fourth lens groups GR3 and GR4 by φ34, the thickness of the negative meniscus lens at a maximum image height in a direction parallel to an optical axis by Tmax, the thickness of the negative meniscus lens G1 on the axis by T0, and the aspheric conical constant of the reflecting surface by kr, the first to fourth lens groups satisfy the following conditional expressions (1) to (5):

$$0.02 < f(\text{all}) \cdot \phi 1 < 0.3 \tag{1}$$

$$3.0 < \phi 12/\phi 34 < 20 \tag{2}$$

$$-2.0 < f(\text{all}) \cdot \phi 12 < -0.2 \tag{3}$$

$$0.1 < T\text{max}/T0 < 5.0 \tag{4}$$

$$-30 < kr < 0 \tag{5}$$

so that correction of various aberrations can be performed further appropriately. Particularly, aberration correction of the distortion and the curvature of field can be performed appropriately. Accordingly, enhancement of the optical characteristics and miniaturization can be achieved satisfactorily.

The conditional expressions (1), (2) and (3) define appropriate ranges of the refracting power among the lens groups, and where the lower limits in the expressions (1), (2) and (3) are exceeded, while the aberration correction of the distortion, curvature of field and so forth are easy, increase in scale of the entire system is invited. On the other hand, where the upper limits are exceeded, the aberration generation amount becomes excessively great, and aberration correction particularly of the distortion, curvature of field and so forth becomes difficult.

The conditional expression (4) defines the difference between the thickness of the negative meniscus lens G1 of the first lens group GR1 on the axis and the thickness of the negative meniscus lens G1 at a maximum image height in a direction parallel to the optical axis, and if any of the upper and lower limits is exceeded, the difference in thickness becomes so great that it gives rise to difficulty in production. In order to further facilitate the production, preferably the thickness Tmax and the thickness T0 of the negative meniscus lens are set so as to be within the range of 0.1<Tmax/T0<2.5.

Preferably, the negative meniscus lens G1 which composes the first lens group GR1 has an aspheric refracting surface S2, S4 (although a single surface is involved, since a flux of light passes through the same twice, two reference characters are applied thereto) and satisfies, where the aspheric conical constant of the refracting surface is represented by kt, the following conditional expression:

$$-15.0 < kt < 15.0 \quad (6)$$

The conditional expression (6) defines an appropriate range of the aspheric shape of the refracting surface s2, s4 of the negative meniscus lens of the first lens group GR1 together with the conditional expression (5) given above. The conditional expression (5) signifies that, in regard to the lower limit direction, the curvature at a peripheral portion of the negative meniscus lens G1 becomes weak when compared with that at a portion in the proximity of the axis. Although this is effective to correction of the distortion aberration and so forth, if the lower limit value is exceeded, then a bad influence is had on the curvature of field and so forth. On the other hand, the conditional expression (5) signifies that, in retard to the upper limit direction, the curvature at a peripheral portion of the negative meniscus lens G1 becomes strong conversely when compared with that at a portion in the proximity of the axis. Then, if the upper limit value is exceeded, then correction of the distortion aberration becomes difficult. The conditional expression (6) has effects in the opposite direction to those of the conditional expression (5), and in the lower limit direction, the curvature at a peripheral portion of the negative meniscus lens G1 becomes weak when compared with that at a portion in the proximity of the axis. At this time, since a negative refracting power appears at the peripheral portion, when the lower limit value is exceeded, correction of the distortion aberration becomes difficult. In the upper limit direction, the curvature at a peripheral portion of the negative meniscus lens G1 becomes strong and a positive refracting factor appears, and this is effective to correction of the distortion aberration. However, if the upper limit value is exceeded, then a bad influence is had on the curvature of field and so forth.

Preferably, where the third order aspheric coefficient of the reflecting surface of the negative meniscus lens G1 is represented by A3R and the third order aspheric coefficient of the refracting surface of the negative meniscus lens G1 is represented by A3T, the aspherical reflecting surface of the negative meniscus lens G1 of the first lens group GR1 includes a term of an odd-numbered order which satisfies the conditional expression (7) or (8):

$$0.0 < A3R < 1.0 \times 10^{-12} \quad (7)$$

$$0.0 < A3T < 1.0 \times 10^{-12} \quad (8)$$

The expressions (7) and (8) define appropriate ranges of the aspheric coefficient of an odd-numbered order. Where third- and fifth-order terms are added to an aspheric coefficient, a term of the third order is added to an ordinary reflecting surface $X (=a1 \cdot \rho^{-2} + a2 \cdot \rho^{-4} + \ldots$, where $\rho^{-2} = Y^{-2} + Z^{-2}$). In this instance, second-order and fourth-order aberrations appear. Aberration correction of the distortion aberration, curvature of field and so forth is facilitated by providing the aspheric coefficient appropriately. Where the lower limits in the expressions (7) and (8) are exceeded, aberration correction cannot be performed sufficiently. On the other hand, where the upper limits are exceeded, excessive correction of the distortion aberration is invited.

Preferably, at least one of faces of a lens or lenses which compose the second lens group GR2 and/or at least one of faces of a lens or lenses which compose the second lens group GR4 are formed from an aspheric surface. This makes it possible to perform aberration correction efficiently and reduce the number of lenses. It is to be noted that the aspheric surface may be an aspheric surface including a term of an odd-numbered order.

Preferably, where the Abbe number of the positive lens at the d-line of the wavelength of 587.6 nm is represented by ν(convex), the refractive index of the positive lens at the g-line of the wavelength of 435.84 nm by ng, the refractive index of the positive lens at the F-line of the wavelength of 486.13 nm by nF, and the refractive index of the positive lens at the C-line of the wavelength of 656.28 nm by nC, the fourth lens group GR4 includes at least one positive lens which satisfies the conditional expressions (9) and (10):

$$0.7 < \Delta P < 6.0 \quad (9)$$

$$60 < \nu(\text{convex}) < 100 \quad (10)$$

where $$\Delta P = \{\Theta - (0.6444 - 0.001689 \cdot \nu(\text{convex}))\} \times 100$$

$$\Theta = (ng - nF)/(nF - nC)$$

The conditional expression (9) defines the abnormal dispersion property of the lens material with respect to the g-line and the F-line quantitatively with ΔP as a deviation from a standard line obtained interconnecting partial dispersions of normal glasses (K7 and F2). More particularly, ΔP and Θ represent partial dispersion ratios of the g-line and the F-line by the used lens material, and 0.6444−0.001689·ν(convex) of ΔP represents a straight line interconnecting the partial dispersions of the normal glass. If the lower limit in the expression is exceeded, since the abnormal dispersion properties with respect to the g-line and the F-line decrease, the magnification chromatic aberration deteriorates. If the upper limit is exceeded, then although the abnormal dispersion property is sufficient, a material of the type described does not normally exist, and even if it is available, it is very expensive.

If the lower limit in the conditional expression (10) is exceeded, then the chromatic aberration on the axis deteriorates. If the upper limit is exceeded, then although correction of the chromatic aberration is sufficient, a material of the type described does not normally exist.

Now, the projection optical systems of the individual embodiments of the present invention and examples of numerical values used in the projection optical systems are described.

FIG. 1 shows a lens system of the projection optical system according to a first embodiment of the present invention.

Referring to FIG. 1, the projection optical system 1 shown includes a first lens group GR1 composed of a negative meniscus lens G1 having a concave surface directed to the projection side, a second lens group GR2 having a negative refracting power, a third lens group GR3 having a positive refracting power and a fourth lens group GR4 having a positive refracting power, disposed in order from the projection side. Thus, the projection optical system 1 has a lens configuration of the four-group retrofocus type.

The concave surface (face on the projection side) s3 of the negative meniscus lens G1 which composes the first lens group GR1 is formed as a reflecting surface having an aspherical shape, and a convex surface (face on the image side) s2, s4 of the negative meniscus lens G1 is formed as a refracting surface of an aspherical shape. The second lens group GR2 includes a second lens G2 in the form of a negative meniscus lens having a convex surface directed to the projection side and another face on the image side which is formed as an aspheric surface, and a third lens G3 in the form of a negative lens. The second lens G2 and the third lens G3 are disposed in order from the projection side. The third lens group GR3 includes a fourth lens G4 in the form of a positive lens, a fifth lens G5 in the form of a positive lens, and a sixth lens G6 in the form of a positive meniscus lens convex to the projection side, disposed in order form the projection side. The fourth lens group GR4 includes a seventh lens G7 in the form of a negative lens having a face on the projection side formed as an aspheric surface, an eighth lens G8 in the form of a negative meniscus lens convex to the projection side, a ninth lens G9 in the form of a positive lens, a tenth lens G10 in the form of a negative lens, an eleventh lens G11 in the form of a positive lens, and a twelfth lens G12 in the form of a positive lens, disposed in order from the projection side.

In the present projection optical system 1, a large air gap is provided between the second lens group GR2 and the third lens group GR3. Therefore, a light path bending unit such as a prism can be interposed in the air gap. This makes it possible to reduce the depthwise dimension of the projection optical system 1.

A numerical value example 1 where the projection optical system 1 according to the first embodiment described above is embodied more particularly is indicated in Tables 1 to 4 and FIG. 2.

Table 1 indicates the radius of curvature, face distance, refractive index nd of the glass material at the d-line and Abbe number vd of the glass material at the d-line of each face together with the focal length "f(all)", F number and image height "y'" of the overall system. It is to be noted that the numerical value example 1 supposes that the projection optical system 1 is applied to a projector, and the reflecting surface of a rear surface mirror Mr positioned between the first lens G1 and a screen is determined as a first face and the other faces are individually numbered in order along the light path toward the image side. Accordingly, since a flux of light passes through the face of the first lens G1 on the image side twice, two face numbers (2 and 4) are applied to the face. It is to be noted that the 27th to 30th faces are faces existing in an image formation section for forming an image to be projected on the screen by the projection optical system 1 and are listed for reference. Further, in Table 1, "INF" signifies a flat plane, and "⋇" in a column next to the column of the face number signifies that the face is an aspheric surface. Further, an iris is represented by the face number "STOP".

TABLE 1 f(all) = 6.292
F number = 2.6
y' = 14.0

| Group | Lens | Si | | Radius of curvature | Distance | nd | vd | Surface |
|---|---|---|---|---|---|---|---|---|
| | | Object | | INF | 252.566 | | | |
| First Group | | 1 | | INF | −185.008 | | | Reflection |
| | G1 | 2 | ⋇ | −428.258 | −15.000 | 1.49744 | 56.1 | |
| | | 3 | ⋇ | −223.054 | 15.000 | 1.49744 | 56.1 | Reflection |
| | | 4 | ⋇ | −428.258 | 96.743 | | | |
| Second Group | G2 | 5 | | 84.086 | 5.024 | 1.52510 | 56.3 | |
| | | 6 | ⋇ | 26.998 | 23.816 | | | |
| | G3 | 7 | | −114.999 | 2.945 | 1.84666 | 23.8 | |
| | | 8 | | 62.868 | 84.694 | | | |
| Third Group | G4 | 9 | | 645.654 | 7.709 | 1.83400 | 37.3 | |
| | | 10 | | −249.064 | 3.449 | | | |
| | G5 | 11 | | 200.243 | 10.000 | 1.83400 | 37.3 | |
| | | 12 | | −1494.025 | 50.192 | | | |
| | G6 | 13 | | 63.194 | 5.323 | 1.71300 | 53.9 | |
| | | 14 | | 73.458 | 54.217 | | | |
| | | STOP | | INF | 9.565 | | | |
| Fourth Group | G7 | 15 | ⋇ | −112.377 | 1.166 | 1.80160 | 40.7 | |
| | | 16 | | 113.837 | 0.398 | | | |
| | G8 | 17 | | 35.191 | 3.325 | 1.80518 | 25.5 | |
| | | 18 | | 32.692 | 2.729 | | | |
| | G9 | 19 | | 49.957 | 13.519 | 1.49700 | 81.6 | |
| | | 20 | | −36.811 | 0.100 | | | |
| | G10 | 21 | | −213.919 | 7.251 | 1.80610 | 40.7 | |
| | | 22 | | 51.043 | 3.021 | | | |
| | G11 | 23 | | 68.827 | 11.799 | 1.49700 | 81.6 | |
| | | 24 | | −71.273 | 24.218 | | | |
| | G12 | 25 | | 86.839 | 10.539 | 1.49700 | 81.6 | |
| | | 26 | | −72.559 | 5.000 | | | |
| | | 27 | | INF | 35.500 | 1.51680 | 64.2 | |
| | | 28 | | INF | 23.000 | 1.84666 | 23.8 | |
| | | 29 | | INF | 1.000 | 1.46010 | 60.0 | |
| | | 30 | | INF | 0.700 | 1.51680 | 64.2 | |

⋇ Aspheric surface
⋇⋇ Aspheric surface including a term of an odd-numbered order In the projection optical system 1 described above, the convex surface s2, s4 of the first lens G1 on the image side, the face (reflecting surface) s3 of the first lens G1 on the projection side, the face s6 of the second lens G2 on the image side and the face s15 of the seventh lens G7 on the projection side are formed as aspheric surfaces. Thus, the fourth-, sixth-, eighth- and tenth-order aspheric coefficients A4, A6, A8 and A10 of the faces in the numerical example 1 are indicated in Table 2 together with the conical constant "K". It is to be noted that, in the present specification, an aspheric surface is defined by an Expression 1 given below, and where an aspheric surface includes a term of an odd-numbered order of the third order or the fifth order, it is defined by another Expression 2 given below. Further, in Table 2, "E-i" of the aspheric coefficient indicates "10-i".

$$X = (C \cdot H^2)/[1+\sqrt{\{1-(1+k) \cdot C^2\}}] + A4 \cdot C^4 A6 \cdot C^6 + A8 \cdot C^8 + \ldots \quad \text{[Expression 1]}$$

where C is the reciprocal number to the radius of curvature, and H the distance in the heightwise direction from the optical axis.

$$X=(C \cdot H^2)/[1+\sqrt{(1-(1+k) \cdot C^2 \cdot H^2)}]+A3 \cdot C^3+A4 \cdot C^4+A5 \cdot C^5+A6 \cdot C^6+A8 \cdot C^8+\ldots \quad \text{[Expression 2]}$$

TABLE 2

|  | K | A4 | A6 | A8 | A10 |
|---|---|---|---|---|---|
| S2, S4 | 2.96170 | −2.21228E−08 | 1.19295E−12 | −1.00952E−17 |  |
| S3 | −16.60312 | −1.23716E−08 | 2.15739E−13 | 5.17424E−18 | −1.41079E−22 |
| S6 | −1.79485 | 8.17503E−06 | −2.46046E−09 | 2.68911E−12 | −2.33695E−15 |
| S15 | 0 | −4.75118E−06 | 7.45378E−10 | −2.22092E−11 | 5.37937E−14 |

Original data for the conditional expressions in the numerical value example 1 are illustrated in Table 3, and individual values relating to the original data are illustrated in Table 4.

TABLE 3

| f(all) | 6.292 |
|---|---|
| φ1 | −0.0108200 |
| φ2 | −0.0400366 |
| φ12 | −0.1045992 |
| φ3 | 0.0103940 |
| φ4 | 0.0166150 |
| φ34 | −0.0024484 |
| T23 | 84.69400 |
| Tmax | 7.53102 |
| T0 | 15.00000 |
| TASr | −0.56637 |
| TAS2 | 0.08877 |
| SASr | −0.26402 |
| SAS2 | 0.18982 | where
  f(all): focal length of the entire system
  φ1: refracting power of the first lens group
  φ2: refracting power of the second lens group
  φ12: composite refracting power of the first and second lens groups
  φ3: refracting power of the third lens group
  φ4: refracting power of the fourth lens group
  φ34: composite refracting power of the third and fourth lens groups
  T23: distance between the second lens group and the third lens group
  Tmax: thickness of the negative meniscus lens at a maximum image height in a direction parallel to the optical axis
  T0: thickness of the negative meniscus lens on the axis
  TAS2: Seidel aberration of the tangential curvature of field generated by the reflecting surface s3
  TAS2: Seidel aberration of the tangential curvature of field generated by the aspheric surface of the second lens G2
  SASr: Seidel aberration of the sagittal curvature of field generated by the reflecting surface s3
  SAS2: Seidel aberration of the sagittal curvature of field generated by the aspheric surface of the second lens G2

TABLE 4

| f(all) · |φ1| | 0.06808 |
|---|---|
| φ1/φ2 | 0.27025 |
| φ12/φ34 | 42.72145 |

TABLE 4-continued

| |φ2|/T23 | 0.00124 |
|---|---|
| fall · φ12 | −0.65814 |

TABLE 4-continued

| fall · φ34 | −0.01541 |
|---|---|
| Tmax/T0 | 0.50207 |
| TAS2 + TASr | −0.47760 |
| SAS2 + SASr | −0.07420 |
| kr | −16.60312 |
| kt | 2.96170 |
| kr/kt | −5.60594 |
| A3R | (—) |
| A3T | (—) |
| A3(2) | (—) |
| ΔP | 3.20(G9, G11, G12) |
| ν(凸) | 81.6(G9, G11, G12) |

(—) represents absence of data where
  kr: aspheric conical constant of the reflecting surface of the negative meniscus lens
  kt: aspheric conical constant of the refracting surface of the negative meniscus lens
  A3R: third order aspheric coefficient of the reflecting surface of the negative meniscus lens
  A3T: third order aspheric coefficient of the refracting surface of the negative meniscus lens
  A3(2): third-order aspheric coefficient of the aspheric surface of the second lens group $$\Delta P=\{\Theta-0.6444-0.001689\nu(\text{convex})\}\times 100\Theta=(ng-nF)/(nF-nC)$$

ν(convex): Abbe number of the positive lens of the fourth lens group at the d-line (587.6 nm)
  ng: refractive index of the positive lens of the fourth lens group at the g-line (435.84 nm)
  nF: refractive index of the positive lens of the fourth lens group at the F-line (486.13 nm)
  nC: refractive index of the positive lens of the fourth lens group at the C-line (656.28 nm)

FIG. 2 illustrates the spherical aberration, astigmatism and distortion aberration of the numerical value example 1. It is to be noted that, in the diagram of the spherical aberration, a solid line indicates an aberration curve at the g-line (wavelength: 435.8 nm), a broken line indicates an aberration curve at the d-line (wavelength: 587.6 nm) and an alternate long and short dash line indicates an aberration curve at the C-line (wavelength: 656.3 nm). In the diagram of the astigmatism, a solid line indicates a sagittal image surface, and a broken line indicates a meridional image surface. According to the projection optical system of the present embodiment, the spherical aberration, astigmatism and distortion aberration are corrected satisfactorily.

Figure 3:
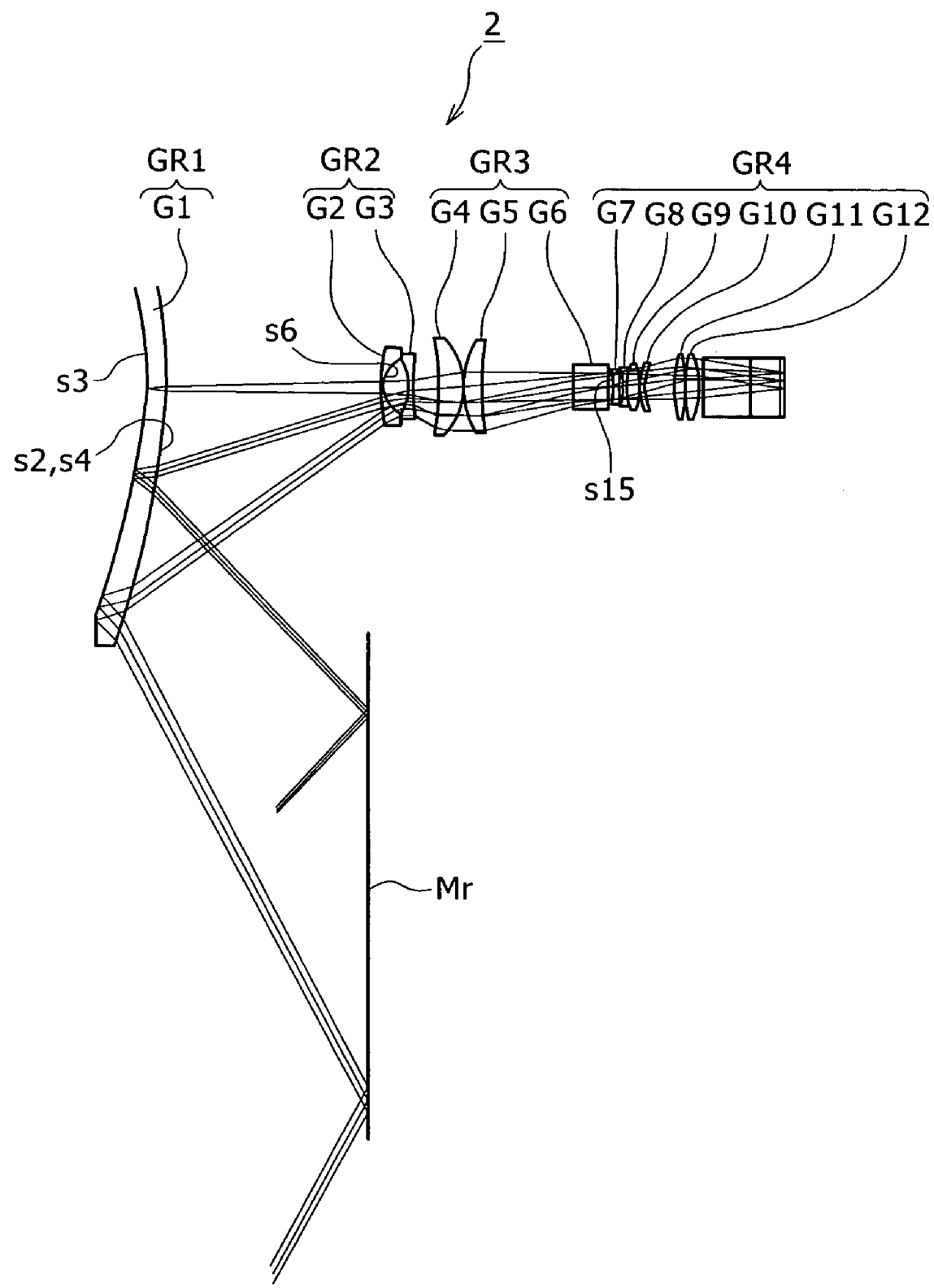
FIG. 3 is a schematic view showing a lens system of a projection optical system according to a second embodiment of the present invention.

FIG. 3 shows a lens system of the projection optical system 2 according to a second embodiment of the present invention.

Referring to FIG. 3, the projection optical system 2 shown includes a first lens group GR1 composed of a negative meniscus lens G1 having a concave surface directed to the projection side, a second lens group GR2 having a negative refracting power, a third lens group GR3 having a positive refracting power and a fourth lens group GR4 having a positive refracting power, disposed in order from the projection side. Thus, the projection optical system 2 has a lens configuration of the four-group retrofocus type.

The concave surface (surface on the projection side) s3 of the negative meniscus lens G1 which composes the first lens group GR1 is formed as a reflecting surface having an aspherical shape, and a convex surface (surface on the image side) s2, s4 of the negative meniscus lens G1 is formed as a refracting surface of an aspherical shape. The second lens group GR2 includes a second lens G2 in the form of a negative meniscus lens having a convex surface directed to the projection side and another surface on the image side which is formed as an aspheric surface, and a third lens G3 in the form of a negative lens. The second lens G2 and the third lens G3 are disposed in order from the projection side. The third lens group GR3 includes a fourth lens G4 in the form of a positive meniscus lens having a convex surface directed to the projection side, a fifth lens G5 in the form of a positive meniscus lens having a convex surface directed to the projection side and a positive lens G6, disposed in order form the projection side. The fourth lens group GR4 includes a seventh lens G7 in the form of a negative lens having a surface on the projection side formed as an aspheric surface, an eighth lens G8 in the form of a negative lens, a ninth lens G9 in the form of a positive lens, a tenth lens G10 in the form of a negative lens having a convex surface directed to the projection side, an eleventh lens G11 in the form of a positive lens, and a twelfth lens G12 in the form of a positive lens, disposed in order from the projection side.

In the present projection optical system 2, a large air gap is provided between the fifth lens G5 and the sixth lens G6 of the third lens group GR3. Therefore, a light path bending unit such as a prism can be interposed in the air gap. This makes it possible to reduce the depthwise dimension of the projection optical system 2.

A numerical value example 2 where the projection optical system 2 according to the second embodiment described above is embodied more particularly is indicated in Tables 5 to 8 and FIG. 4.

Table 5 indicates the radius of curvature, surface distance, refractive index nd of the glass material at the d-line and Abbe number vd of the glass material at the d-line of each surface together with the focal length "f(all)", F number and image height "y'" of the overall system. It is to be noted that the numerical value example 2 supposes that the projection optical system 2 is applied to a projector, and the reflecting surface of a rear surface mirror Mr positioned between the first lens G1 and a screen is determined as a first face and the other faces are individually numbered in order along the light path toward the image side. Accordingly, since a flux of light passes through the face of the first lens G1 on the image side twice, two face numbers (2 and 4) are applied to the face. It is to be noted that the 27th to 30th faces are faces existing in an image formation section for forming an image to be projected on the screen by the projection optical system 2 and are listed for reference. Further, in Table 5, "INF" signifies a flat plane, and ":X:" in a column next to the column of the face number signifies that the face is an aspheric surface. Further, an iris is represented by the face number "STOP".

TABLE 5 f(all) = 6.100
F number = 2.6
y' = 14.0

| Group | Lens | Si | | Radius of curvature | Distance | nd | vd | Surface |
|---|---|---|---|---|---|---|---|---|
| | | Object | | INF | 261.251 | | | |
| First Group | | 1 | | INF | −160.000 | | | Reflection |
| | G1 | 2 | :X: | −420.456 | −15.000 | 1.49744 | 56.1 | |
| | | 3 | :X: | −195.142 | 15.000 | 1.49744 | 56.1 | Reflection |
| | | 4 | :X: | −420.456 | 169.096 | | | |
| Second Group | G2 | 5 | | 264.203 | 2.967 | 1.52510 | 56.3 | |
| | | 6 | :X: | 29.646 | 19.851 | | | |
| | G3 | 7 | | −42.773 | 2.318 | 1.84666 | 23.8 | |
| | | 8 | | 156.162 | 20.759 | | | |
| Third Group | G4 | 9 | | −299.067 | 19.069 | 1.83400 | 37.3 | |
| | | 10 | | −60.988 | 0.550 | | | |
| | G5 | 11 | | 94.898 | 14.834 | 1.83400 | 37.3 | |
| | | 12 | | 463.486 | 70.677 | | | |
| | G6 | 13 | | 1354.292 | 25.988 | 1.71300 | 53.9 | |
| | | 14 | | −247.044 | 0.100 | | | |
| | | STOP | | INF | 6.107 | | | |
| Fourth Group | G7 | 15 | :X: | −1310.269 | 5.945 | 1.80160 | 40.7 | |
| | | 16 | | 177.164 | 2.825 | | | |
| | G8 | 17 | | −149.539 | 2.559 | 1.80518 | 25.5 | |
| | | 18 | | 165.530 | 0.507 | | | |
| | G9 | 19 | | 61.961 | 8.767 | 1.49700 | 81.6 | |
| | | 20 | | −46.823 | 0.107 | | | |
| | G10 | 21 | | 62.575 | 2.559 | 1.80610 | 40.7 | |
| | | 22 | | 38.150 | 25.407 | | | |
| | G11 | 23 | | 127.422 | 8.203 | 1.49700 | 81.6 | |
| | | 24 | | −91.242 | 0.107 | | | |
| | G12 | 25 | | 121.089 | 9.268 | 1.49700 | 81.6 | |

TABLE 5-continued f(all) = 6.100
F number = 2.6
y' = 14.0

| Group | Lens | Si | Radius of curvature | Distance | nd | vd | Surface |
|---|---|---|---|---|---|---|---|
| | | 26 | −76.718 | 5.000 | | | |
| | | 27 | INF | 35.500 | 1.51680 | 64.2 | |
| | | 28 | INF | 23.000 | 1.84666 | 23.8 | |
| | | 29 | INF | 1.000 | 1.46010 | 60.0 | |
| | | 30 | INF | 0.700 | 1.51680 | 64.2 | |

※ Aspheric surface
※·※ Aspheric surface including a term of an odd-numbered order In the projection optical system 2 described above, the convex surface s2, s4 of the first lens G1 on the image side, the face (reflecting surface) s3 of the first lens G1 on the projection side, the face s6 of the second lens G2 on the image side and the face s15 of the seventh lens G7 on the projection side are formed as aspheric surfaces. Thus, the fourth-, sixth-, eighth- and tenth-order aspheric coefficients A4, A6, A8 and A10 of the faces in the numerical example 2 are indicated in Table 6 together with the conical constant "K".

TABLE 6

| | K | A4 | A6 | A8 | A10 |
|---|---|---|---|---|---|
| S2, S4 | 1.87674 | 6.66165E−09 | 2.85628E−13 | −2.54281E−18 | |
| S3 | −12.16085 | −1.38944E−09 | 1.06919E−13 | −3.09915E−19 | −2.48671E−23 |
| S6 | −0.74094 | 3.96352E−06 | −1.87065E−09 | 4.54798E−12 | −4.09213E−15 |
| S15 | −28164.26895 | −5.04107E−06 | 1.33506E−08 | −8.17436E−11 | 1.94347E−13 |

Original data for the conditional expressions in the numerical value example 2 are illustrated in Table 7, and individual values relating to the original data are illustrated in Table 8.

TABLE 7

| f(all) | 6.100 |
|---|---|
| φ1 | −0.0126474 |
| φ2 | −0.0488949 |
| φ12 | −0.1801119 |
| φ3 | 0.0163294 |
| φ4 | 0.0184797 |
| φ34 | −0.0139721 |
| T23 | 20.75900 |
| Tmax | 16.20000 |
| T0 | 15.00000 |
| TASr | −0.69595 |
| TAS2 | 0.88658 |
| SASr | −0.31798 |
| SAS2 | 0.44145 |

TABLE 8

| f(all) · |φ1| | 0.07715 |
|---|---|
| φ1/φ2 | 0.25867 |
| φ12/φ34 | 12.89083 |
| |φ2|/T23 | 0.00868 |
| f(all) · φ12 | −1.09868 |
| f(all) · φ34 | −0.08523 |
| Tmax/T0 | 1.08000 |
| TAS2 + TASr | 0.19063 |
| SAS2 + SASr | 0.12347 |
| kr | −12.16085 |
| kt | 1.87674 |

TABLE 8-continued

| kr/kt | −6.47977 |
|---|---|
| A3R | (—) |
| A3T | (—) |
| A3(2) | (—) |
| ΔP | 3.20(G9, G11, G12) |
| ν(凸) | 81.6(G9, G11, G12) |

FIG. 4 illustrates the spherical aberration, astigmatism and distortion aberration of the numerical value example 2. It is to be noted that, in the diagram of the spherical aberration, a solid line indicates an aberration curve at the g-line (wavelength: 435.8 nm), a broken line indicates an aberration curve at the d-line (wavelength: 587.6 nm) and an alternate long and short dash line indicates an aberration curve at the C-line (wavelength: 656.3 nm). In the diagram of the astigmatism, a solid line indicates a sagittal image surface, and a broken line indicates a meridional image surface.

Figure 5:
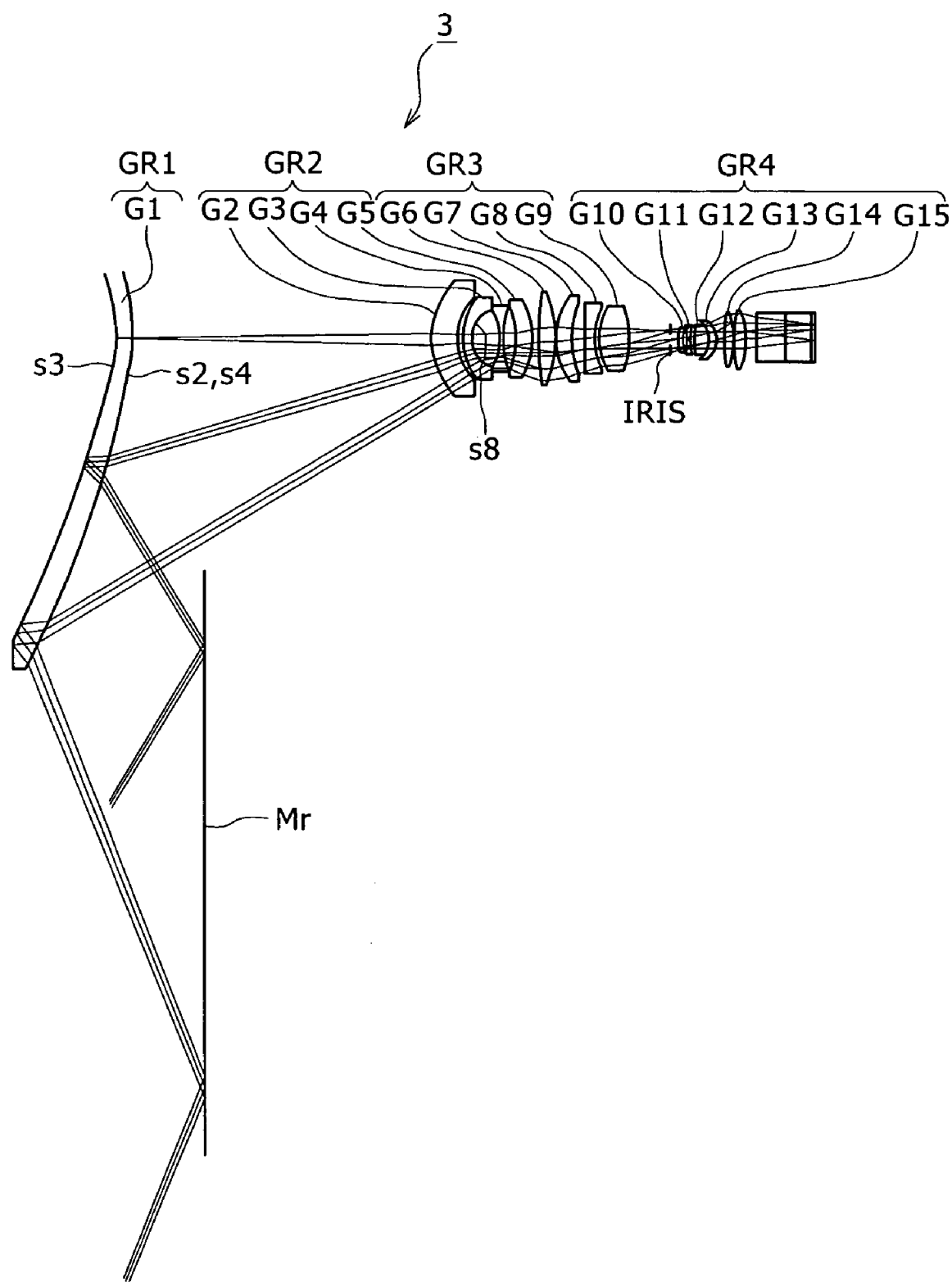
FIG. 5 is a schematic view showing a lens system of a projection optical system according to a third embodiment of the present invention.

FIG. 5 shows a lens system of the projection optical system 3 according to a third embodiment of the present invention.

Referring to FIG. 5, the projection optical system 3 shown includes a first lens group GR1 composed of a negative meniscus lens G1 having a concave surface directed to the projection side, a second lens group GR2 having a negative refracting power, a third lens group GR3 having a positive refracting power and a fourth lens group GR4 having a positive refracting power, disposed in order from the projection side. Thus, the projection optical system 3 has a lens configuration of the four-group retrofocus type.

The concave surface (face on the projection side) s3 of the negative meniscus lens G1 which composes the first lens group GR1 is formed as a reflecting surface having an aspherical shape, and a convex surface (face on the image side) s2, s4 of the negative meniscus lens G1 is formed as a refracting surface of an aspherical shape. The second lens group GR2 includes a second lens G2 in the form of a negative meniscus lens having a convex surface directed to the projection side, a third lens G3 in the form of a negative meniscus lens having a convex surface directed to the projection side and having a face on the image side formed as an aspheric surface, a fourth lens G4 in the form of a negative lens, and a fifth lens G5 in the form of a positive meniscus lens having a concave surface directed to the projection side. The second to fifth lenses G2 to G5 are disposed in order from the projection side. The third lens group GR3 includes a sixth lens G6 in the form of a positive lens, a seventh lens G7 in the form of a positive meniscus lens having a convex surface directed to the projection side, an eighth lens G8 in the form of a negative lens and a ninth lens G9 in the form of a positive lens, disposed in order form the projection side. The fourth lens group GR4 includes a tenth lens G10 in the form of a positive meniscus lens having a convex surface directed to the projection side, an eleventh lens G11 in the form of a negative lens, a twelfth lens G12 in the form of a positive lens, a thirteenth lens G13 in the form of a negative meniscus lens having a concave surface directed to the projection side, a fourteenth lens G14 in the form of a positive lens, and a fifteenth lens G15 in the form of a positive lens, disposed in order from the projection side.

A numerical value example 3 where the projection optical system 3 according to the third embodiment described above is embodied more particularly is indicated in Tables 9 to 12 and FIG. 6.

Table 9 indicates the radius of curvature, face distance, refractive index nd of the glass material at the d-line and Abbe number vd of the glass material at the d-line of each face together with the focal length "f(all)", F number and image height "y'" of the overall system. It is to be noted that the numerical value example 3 supposes that the projection optical system 3 is applied to a projector, and the reflecting surface of a rear surface mirror Mr positioned between the first lens G1 and a screen is determined as a first face and the other faces are individually numbered in order along the light path toward the image side. Accordingly, since a flux of light passes through the face of the first lens G1 on the image side twice, two face numbers (2 and 4) are applied to the face. It is to be noted that the 33rd to 36th faces are faces existing in an image formation section for forming an image to be projected on the screen by the projection optical system 3 and are listed for reference. Further, in Table 9, "INF" signifies a flat plane, and "✖" in a column next to the column of the face number signifies that the face is an aspheric surface. Further, an iris is represented by the face number "STOP".

TABLE 9 f(all) = 3.750
F number = 2.6
y' = 14.0

| Group | Lens | Si | | Radius of curvature | Distance | nd | vd | Surface |
|---|---|---|---|---|---|---|---|---|
| | | Object | | INF | 164.747 | | | |
| | | 1 | | INF | −70.000 | | | Reflection |
| First Group | G1 | 2 | ✖ | −284.477 | −15.000 | 1.52510 | 56.3 | |
| | | 3 | ✖ | −155.966 | 15.000 | 1.52510 | 56.3 | Reflection |
| | | 4 | ✖ | −284.477 | 248.228 | | | |
| Second Group | G2 | 5 | | 80.393 | 25.553 | 1.80880 | 28.0 | |
| | | 6 | | 63.116 | 5.387 | | | |
| | G3 | 7 | | 88.008 | 8.000 | 1.52510 | 56.3 | |
| | | 8 | ✖ | 28.726 | 24.884 | | | |
| | G4 | 9 | | −57.864 | 4.265 | 1.79860 | 22.6 | |
| | | 10 | | 114.962 | 12.058 | | | |
| | G5 | 11 | | −88.666 | 14.704 | 1.74803 | 44.5 | |
| | | 12 | | −76.468 | 8.148 | | | |
| Third Group | G6 | 13 | | 377.996 | 15.750 | 1.66051 | 55.4 | |
| | | 14 | | −86.287 | 0.480 | | | |
| | G7 | 15 | | 77.164 | 16.800 | 1.80338 | 23.1 | |
| | | 16 | ✖ | 203.307 | 11.248 | | | |
| | G8 | 17 | | −606.795 | 10.241 | 1.69260 | 37.4 | |
| | | 18 | | 62.373 | 5.648 | | | |
| | G9 | 19 | | 83.384 | 26.116 | 1.50225 | 60.7 | |
| | | 20 | | −131.790 | 45.778 | | | |
| | | STOP | | INF | 4.107 | | | |
| Fourth Group | G10 | 21 | | 76.485 | 3.227 | 1.79798 | 22.6 | |
| | | 22 | | 629.432 | 5.795 | | | |
| | G11 | 23 | | −151.115 | 2.559 | 1.67012 | 28.5 | |
| | | 24 | | 45.100 | 4.314 | | | |
| | G12 | 25 | | 624.500 | 8.767 | 1.49700 | 81.6 | |
| | | 26 | | −21.779 | 0.500 | | | |
| | G13 | 27 | | 21.910 | 2.559 | 1.80610 | 40.7 | |
| | | 28 | | −40.996 | 15.533 | | | |
| | G14 | 29 | | 251.996 | 8.203 | 1.49700 | 81.6 | |
| | | 30 | | −64.418 | 0.107 | | | |
| | G15 | 31 | | 84.897 | 9.268 | 1.49700 | 81.6 | |
| | | 32 | | −89.681 | 12.000 | | | |
| | | 33 | | INF | 27.000 | 1.84666 | 23.8 | |
| | | 34 | | INF | 21.000 | 1.84666 | 23.8 | |
| | | 35 | | INF | 2.000 | 1.51680 | 64.2 | |

✖ Aspheric surface
✖✖ Aspheric surface including a term of an odd-numbered order In the projection optical system 3 described above, the convex surface s2, s4 of the first lens G1 on the image side, the face (reflecting surface) s3 of the first lens G1 on the projection side and the face s8 of the third lens G3 on the image side are formed as aspheric surfaces. Thus, the fourth-, sixth-, eighth- and tenth-order aspheric coefficients A4, A6, A8 and A10 of the faces in the numerical example 3 are indicated in Table 10 together with the conical constant "K".

TABLE 10

|  | K | A4 | A6 | A8 | A10 |
|---|---|---|---|---|---|
| S2, S4 | −5.36319 | | | | |
| S3 | −6.48508 | 2.00230E−10 | 5.78010E−15 | −8.15674E−20 | 3.33126E−25 |
| S8 | −0.64048 | 2.27246E−06 | −1.05266E−09 | 1.78691E−12 | −1.02877E−15 |

Original data for the conditional expressions in the numerical value example 3 are illustrated in Table 11, and individual values relating to the original data are illustrated in Table 12.

TABLE 11

| f(all) | 3.750 |
|---|---|
| φ1 | −0.0152286 |
| φ2 | −0.0286965 |
| φ12 | −0.1946875 |
| φ3 | 0.0135709 |
| φ4 | 0.0201089 |
| φ34 | −0.007716 |
| T23 | 8.14800 |
| Tmax | 14.99992 |
| T0 | 15.00000 |
| TASr | −0.68194 |
| TAS2 | 0.79244 |
| SASr | −0.34220 |
| SAS2 | 0.42792 |

TABLE 12

| f(all) · |φ1| | 0.05711 |
|---|---|
| φ1/φ2 | 0.53068 |
| |φ12|/φ3 | 14.34595 |
| φ2|/T23 | 0.02389 |
| fall · φ12 | −0.73008 |
| fall · φ34 | −0.02894 |
| Tmax/T0 | 0.99999 |
| TAS2 + TASr | 0.11050 |
| SAS2 + SASr | 0.08572 |
| kr | −6.48508 |
| kt | −5.36319 |
| kr/kt | 1.20918 |
| A3R | (—) |
| A3T | (—) |
| A3(2) | (—) |
| ΔP | 3.20(G12, G14, G15) |
| ν(凸) | 81.6(G12, G14, G15) |

FIG. 6 illustrates the spherical aberration, astigmatism and distortion aberration of the numerical value example 3. It is to be noted that, in the diagram of the spherical aberration, a solid line indicates an aberration curve at the g-line (wavelength: 435.8 nm), a broken line indicates an aberration curve at the d-line (wavelength: 587.6 nm) and an alternate long and short dash line indicates an aberration curve at the C-line (wavelength: 656.3 nm). In the diagram of the astigmatism, a solid line indicates a sagittal image surface, and a broken line indicates a meridional image surface. According to the projection optical system of the present embodiment, the spherical aberration, astigmatism and distortion aberration are corrected satisfactorily.

Figure 7:
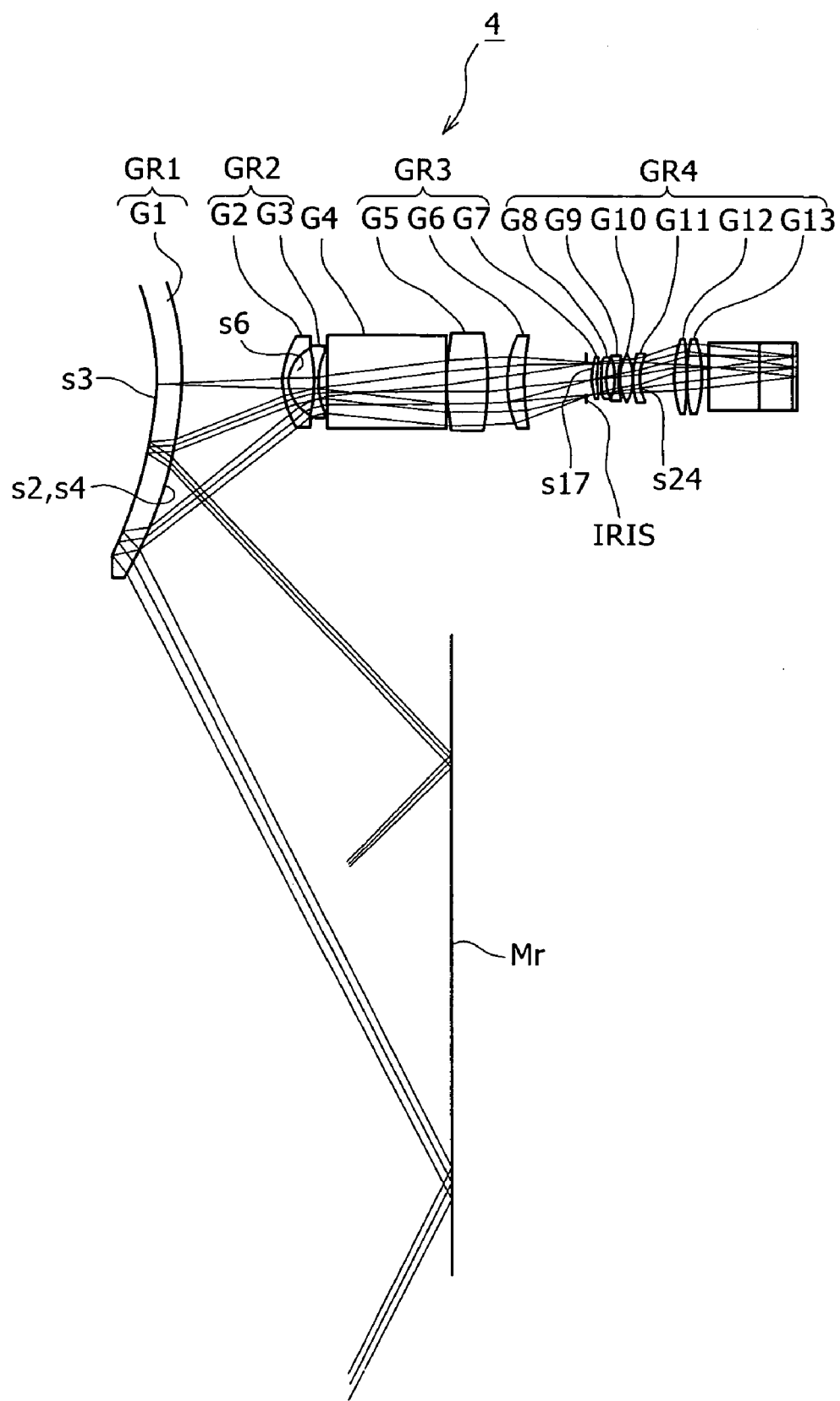
FIG. 7 is a schematic view showing a lens system of a projection optical system according to a fourth embodiment of the present invention.

FIG. 7 shows a lens system of the projection optical system 4 according to a fourth embodiment of the present invention.

Referring to FIG. 7, the projection optical system 4 shown includes a first lens group GR1 composed of a negative meniscus lens G1 having a concave surface directed to the projection side, a second lens group GR2 having a negative refracting power, a third lens group GR3 having a positive refracting power and a fourth lens group GR4 having a positive refracting power, disposed in order from the projection side. Further, a glass element G4 is interposed between the second lens group GR2 and the third lens group GR3. Thus, the projection optical system 4 has a lens configuration of the four-group retrofocus type.

The concave surface (face on the projection side) s3 of the negative meniscus lens G1 which composes the first lens group GR1 is formed as a reflecting surface having an aspherical shape, and a convex surface (face on the image side) s2, s4 of the negative meniscus lens G1 is formed as a refracting surface of an aspherical shape. The second lens group GR2 includes a second lens G2 in the form of a negative meniscus lens having a convex surface directed to the projection side and having a face on the image side formed as an aspheric surface and a third lens G3 in the form of a negative meniscus lens, disposed in order from the projection side. The third lens group GR3 includes a fifth lens G5 in the form of a positive lens, a sixth lens G6 in the form of a positive meniscus lens having a convex surface directed to the projection side, and a seventh lens G7 in the form of a positive meniscus lens having a convex surface directed to the projection side. The fifth to seventh lenses G5 to G7 are disposed in order from the projection side. The fourth lens group GR4 includes an eighth lens G8 in the form of a negative meniscus lens having a convex surface directed to the projection side and having a face on the projection side formed as an aspheric surface, a ninth lens G9 in the form of a negative lens, a tenth lens G10 in the form of a positive lens, an eleventh lens G11 in the form of a negative lens having a face on the image side as an aspheric surface, a twelfth lens G12 in the form of a positive lens, and a thirteenth lens G13 in the form of a positive lens, disposed in order from the projection side.

In the projection optical system 4 according to the present fourth embodiment, since the glass element G4 is interposed between the second lens group GR2 and the third lens group GR3, if a light path bending unit such as a prism is interposed in place of the glass element 4, then the light path can be bent. This makes it possible to reduce the depthwise dimension of the projection optical system 4, that is, the size of the projection optical system 4 in the projection direction. It is to be noted that the element for bending the light path to reduce the depthwise dimension of the projection optical system is not limited to a prism, but may be some other unit such as, for example, a mirror.

A numerical value example 4 where the projection optical system 4 according to the fourth embodiment described above is embodied more particularly is indicated in Tables 13 to 16 and FIG. 8.

Table 13 indicates the radius of curvature, face distance, refractive index nd of the glass material at the d-line and Abbe number vd of the glass material at the d-line of each face together with the focal length "f(all)", F number and image height "y'" of the overall system. It is to be noted that the numerical value example 4 supposes that the projection optical system 4 is applied to a projector, and the reflecting surface of a rear surface mirror Mr positioned between the first lens G1 and a screen is determined as a first face and the other faces are individually numbered in order along the light path toward the image side. Accordingly, since a flux of light passes through the face of the first lens G1 on the image side twice, two face numbers (2 and 4) are applied to the face. It is to be noted that the 29th to 32nd faces are faces existing in an image formation section for forming an image to be projected on the screen by the projection optical system 4 and are listed for reference. Further, in Table 13, "INF" signifies a flat plane, and "✕" in a column next to the column of the face number signifies that the face is an aspheric surface. Further, an iris is represented by the face number "STOP".

TABLE 13 f(all) = 6.315
F number = 2.6
y' = 14.0

| Group | Lens | Si | | Radius of curvature | Distance | Nd | vd | Surface |
|---|---|---|---|---|---|---|---|---|
| | | Object | | INF | 272.425 | | | |
| | | 1 | | INF | −185.000 | | | Reflection |
| First Group | G1 | 2 | ✕ | −264.535 | −15.000 | 1.49744 | 56.1 | |
| | | 3 | ✕·✕ | 138.170 | 15.000 | 1.49744 | 56.1 | Reflection |
| | | 4 | ✕ | −264.535 | 70.050 | | | |
| Second Group | G2 | 5 | | 51.686 | 2.967 | 1.52510 | 56.3 | |
| | | 6 | ✕ | 24.344 | 17.976 | | | |
| | G3 | 7 | | −96.936 | 2.318 | 1.84666 | 23.8 | |
| | | 8 | | 46.115 | 6.948 | | | |
| | G4 | 9 | | INF | 80.835 | 1.51680 | 64.200 | |
| | | 10 | | INF | 0.195 | | | |
| Third Group | G5 | 11 | | 262.123 | 28.100 | 1.83400 | 37.3 | |
| | | 12 | | −186.456 | 13.412 | | | |
| | G6 | 13 | | 67.426 | 11.123 | 1.83400 | 37.3 | |
| | | 14 | | 166.510 | 49.698 | | | |
| | G7 | 15 | | 53.729 | 2.453 | 1.71300 | 53.9 | |
| | | 16 | | 91.801 | 0.100 | | | |
| | | STOP | | INF | 4.775 | | | |
| Fourth Group | G8 | 17 | ✕ | 1577.829 | 5.945 | 1.80610 | 40.7 | |
| | | 18 | | 88.332 | 2.825 | | | |
| | G9 | 19 | | −86.808 | 2.559 | 1.80518 | 25.5 | |
| | | 20 | | 113.090 | 0.507 | | | |
| | G10 | 21 | | 52.397 | 8.767 | 1.49700 | 81.6 | |
| | | 22 | | −28.340 | 0.107 | | | |
| | G11 | 23 | | −831.833 | 2.559 | 1.80610 | 40.7 | |
| | | 24 | ✕ | 54.443 | 25.407 | | | |
| | G12 | 25 | | 107.560 | 8.203 | 1.49700 | 81.6 | |
| | | 26 | | −97.807 | 0.107 | | | |
| | G13 | 27 | | 125.792 | 9.268 | 1.49700 | 81.6 | |
| | | 28 | | −71.509 | 5.000 | | | |
| | | 29 | | INF | 35.500 | 1.51680 | 64.2 | |
| | | 30 | | INF | 23.000 | 1.84666 | 23.8 | |
| | | 31 | | INF | 1.000 | 1.46010 | 60.0 | |
| | | 32 | | INF | 0.700 | 1.51680 | 64.2 | |

✕ Aspheric surface
✕·✕ Aspheric surface including a term of an odd-numbered order In the projection optical system 4 described above, the convex surface s2, s4 of the first lens G1 on the image side, the face (reflecting surface) s3 of the first lens G1 on the projection side, the face s6 of the second lens G2 on the image side, the face s17 of the eighth lens G8 on the projection side and the face s24 of the eleventh lens G11 on the image side are formed as aspheric surfaces. Thus, the fourth-, sixth-, eighth- and tenth-order aspheric coefficients A4, A6, A8 and A10 of the faces in the numerical example 4 are indicated in Table 14 together with the conical constant "K".

TABLE 14

| | K | A4 | A6 | A8 | A10 |
|---|---|---|---|---|---|
| S2, S4 | 1.75803 | −6.15235E−08 | 5.75012E−12 | −7.00202E−17 | |
| S3 | −12.92508 | −4.43591E−08 | 2.10720E−12 | 2.33211E−18 | −1.25537E−21 |

TABLE 14-continued

|  | K | A4 | A6 | A8 | A10 |
|---|---|---|---|---|---|
| S6 | −1.45678 | 9.42139E−06 | −3.72048E−10 | 3.67301E−12 | −1.22045E−14 |
| S17 | 0 | −5.66947E−06 | −2.90501E−09 | −4.56290E−11 | 1.23761E−13 |
| S24 | 1.608862 | 2.90817E−06 | 5.58643E−10 | −7.51100E−12 | 3.30174E−14 |

Original data for the conditional expressions in the numerical value example 4 are illustrated in Table 15, and individual values relating to the original data are illustrated in Table 16.

TABLE 15

| f(all) | 6.315 |
|---|---|
| φ1 | −0.0170952 |
| φ2 | −0.0433833 |
| φ12 | −0.1307783 |
| φ3 | 0.0146024 |
| φ4 | 0.0175022 |
| φ34 | 0.0002042 |
| T23 | 60.43657 |
| Tmax | 8.00906 |
| T0 | 15.00000 |
| TASr | −0.89199 |
| TAS2 | 0.14926 |
| SASr | −0.41831 |
| SAS2 | 0.22745 |

TABLE 16

| f(all) · |φ1| | 0.10796 |
|---|---|
| φ1/φ2 | 0.39405 |
| |φ12|/φ3 | 8.95595 |
| |φ2|/T23 | 0.00216 |
| fall · φ12 | −0.82586 |
| fall · φ34 | 0.00129 |
| Tmax/T0 | 0.53394 |
| TAS2 + TASr | −0.74273 |
| SAS2 + SASr | −0.19085 |
| kr | −12.92508 |
| kt | 1.75803 |
| kr/kt | −7.35202 |
| A3R | (—) |
| A3T | (—) |
| A3(2) | (—) |
| ΔP | 3.20(G9, G11, G12) |
| Δ(⌂) | 81.6(G9, G11, G12) |

FIG. 8 illustrates the spherical aberration, astigmatism and distortion aberration of the numerical value example 4. It is to be noted that, in the diagram of the spherical aberration, a solid line indicates an aberration curve at the g-line (wavelength: 435.8 nm), a broken line indicates an aberration curve at the d-line (wavelength: 587.6 nm) and an alternate long and short dash line indicates an aberration curve at the C-line (wavelength: 656.3 nm). In the diagram of the astigmatism, a solid line indicates a sagittal image surface, and a broken line indicates a meridional image surface. According to the projection optical system of the present embodiment, the spherical aberration, astigmatism and distortion aberration are corrected satisfactorily.

Figure 9:
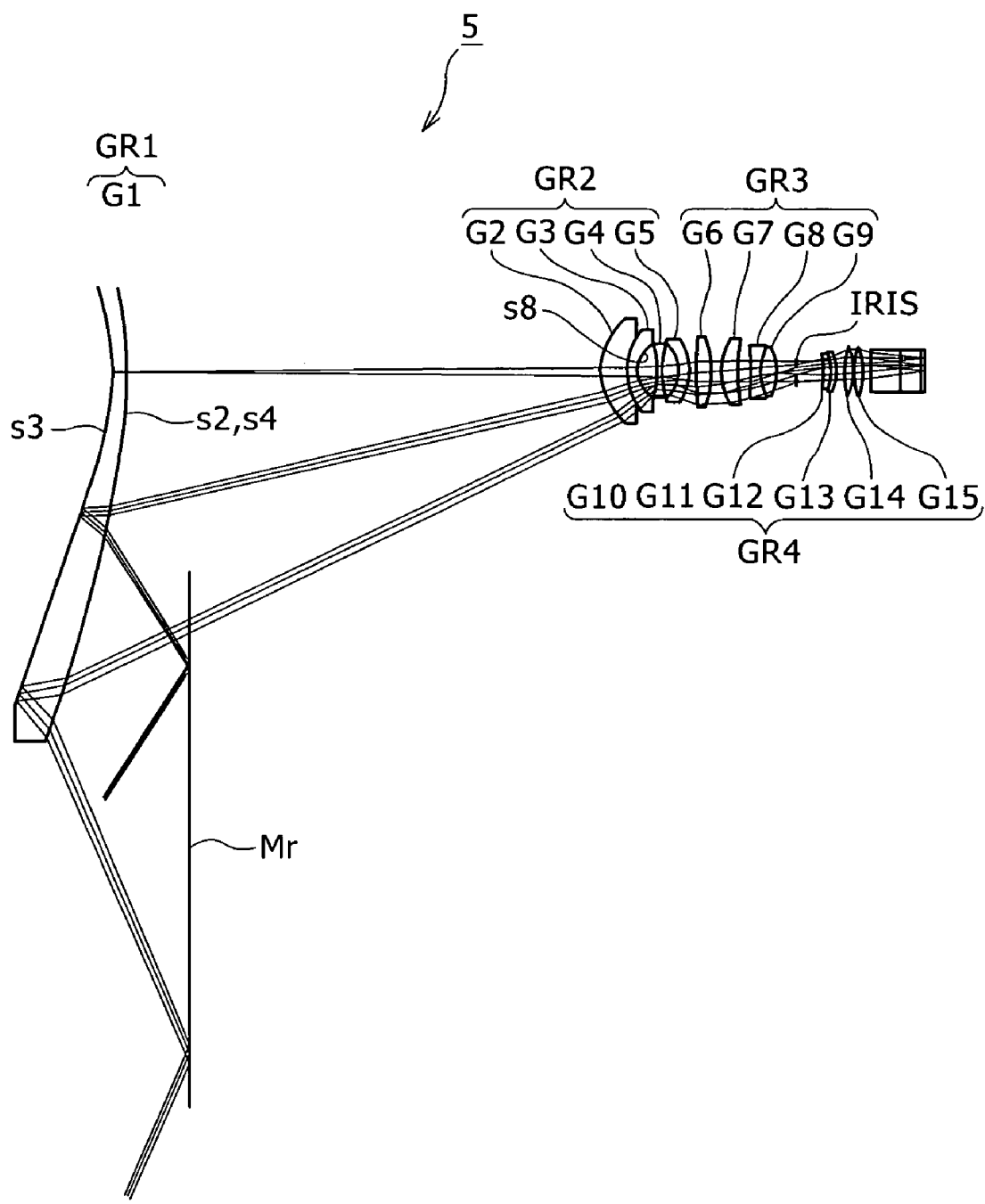
FIG. 9 is a schematic view showing a lens system of a projection optical system according to a fifth embodiment of the present invention.

FIG. 9 shows a lens system of the projection optical system 5 according to a fifth embodiment of the present invention.

Referring to FIG. 9, the projection optical system 5 shown includes a first lens group GR1 composed of a negative meniscus lens G1 having a concave surface directed to the projection side, a second lens group GR2 having a negative refracting power, a third lens group GR3 having a positive refracting power and a fourth lens group GR4 having a positive refracting power, disposed in order from the projection side. Thus, the projection optical system 5 has a lens configuration of the four-group retrofocus type.

The concave surface (face on the projection side) s3 of the negative meniscus lens G1 which composes the first lens group GR1 is formed as a reflecting surface having an aspherical shape, and a convex surface (face on the image side) s2, s4 of the negative meniscus lens G1 is formed as a refracting surface of an aspherical shape. The second lens group GR2 includes a second lens G2 in the form of a positive meniscus lens having a convex surface directed to the projection side, a third lens G3 in the form of a negative meniscus lens having a convex surface directed to the projection side and having a face on the image side formed as an aspheric surface, a fourth lens G4 in the form of a negative lens, and a fifth lens G5 in the form of a negative meniscus lens having a concave surface directed to the projection side, disposed in order from the projection side. The third lens group GR3 includes a sixth lens G6 in the form of a positive lens, a seventh lens G7 in the form of a positive meniscus lens having a convex surface directed to the projection side, an eighth lens G8 in the form of a negative lens, and a ninth lens G9 in the form of a positive lens, disposed in order from the projection side. The fourth lens group GR4 includes a tenth lens G10 in the form of a negative meniscus lens having a concave surface directed to the projection side, an eleventh lens G11 in the form of a negative meniscus lens having a convex surface directed to the projection side, a twelfth lens G12 in the form of a positive meniscus lens having a concave surface directed to the projection side, a thirteenth lens G13 in the form of a negative meniscus lens having a concave surface directed to the projection side, a fourteenth lens G14 in the form of a positive lens, and a fifteenth lens G15 in the form of a positive lens, disposed in order from the projection side.

A numerical value example 5 where the projection optical system 5 according to the fifth embodiment described above is embodied more particularly is indicated in Tables 17 to 20 and FIG. 10.

Table 17 indicates the radius of curvature, face distance, refractive index nd of the glass material at the d-line and Abbe number vd of the glass material at the d-line of each face together with the focal length "f(all)", F number and image height "y'" of the overall system. It is to be noted that the numerical value example 5 supposes that the projection optical system 5 is applied to a projector, and the reflecting surface of a rear surface mirror Mr positioned between the first lens G1 and a screen is determined as a first face and the other faces are individually numbered in order along the light path toward the image side. Accordingly, since a flux of light passes through the face of the first lens G1 on the image side twice, two face numbers (2 and 4) are applied to the face. It is to be noted that the 33rd to 36th faces are faces existing in an image formation section for forming an image to be projected on the screen by the projection optical system 5 and are listed for reference. Further, in Table 17, "INF" signifies a flat plane, and "✗" in a column next to the column of the face number signifies that the face is an aspheric surface. Further, an iris is represented by the face number "STOP".

TABLE 17 f(all) = 4.000
F number = 2.8
Y' = 14.5

| Group | Lens | Si | | Radius of curvature | Distance | nd | vd | Surface |
|---|---|---|---|---|---|---|---|---|
| | | Object | | INF | 161.120 | | | |
| | | 1 | | INF | −70.000 | | | Reflection |
| First Group | G1 | 2 | ※ | −666.778 | −15.000 | 1.52510 | 56.3 | |
| | | 3 | ※ | −239.728 | 15.000 | 1.52510 | 56.3 | Reflection |
| | | 4 | ※ | −666.778 | 510.571 | | | |
| Second Group | G2 | 5 | | 71.960 | 31.000 | 1.84793 | 35.7 | |
| | | 6 | | 100.575 | 0.700 | | | |
| | G3 | 7 | | 93.726 | 8.000 | 1.52510 | 56.3 | |
| | | 8 | ※ | 30.358 | 22.248 | | | |
| | G4 | 9 | | −103.029 | 4.265 | 1.79850 | 22.6 | |
| | | 10 | | 58.306 | 17.598 | | | |
| | G5 | 11 | | −44.330 | 14.800 | 1.74804 | 51.8 | |
| | | 12 | | −52.627 | 7.609 | | | |
| Third Group | G6 | 13 | | 598.125 | 14.000 | 1.79149 | 46.1 | |
| | | 14 | | −135.161 | 13.772 | | | |
| | G7 | 15 | | 86.164 | 16.800 | 1.77020 | 24.6 | |
| | | 16 | | 290.784 | 15.490 | | | |
| | G8 | 17 | | −522.081 | 11.000 | 1.56202 | 42.6 | |
| | | 18 | | 47.385 | 1.590 | | | |
| | G9 | 19 | | 50.430 | 10.000 | 1.49864 | 68.9 | |
| | | 20 | | −90.566 | 31.670 | | | |
| | | STOP | | INF | 4.107 | | | |
| Fourth Group | G10 | 21 | | −47.047 | 3.227 | 1.51212 | 65.8 | |
| | | 22 | | −76.775 | 1.509 | | | |
| | G11 | 23 | | 57.904 | 2.559 | 1.57718 | 38.2 | |
| | | 24 | | 36.179 | 9.880 | | | |
| | G12 | 25 | | −357.091 | 8.767 | 1.49700 | 81.6 | |
| | | 26 | | −22.139 | 0.500 | | | |
| | G13 | 27 | | −22.250 | 2.559 | 1.80610 | 40.7 | |
| | | 28 | | −43.625 | 11.202 | | | |
| | G14 | 29 | | 375.797 | 8.203 | 1.49700 | 81.6 | |
| | | 30 | | −59.342 | 0.107 | | | |
| | G15 | 31 | | 83.570 | 9.268 | 1.49700 | 81.6 | |
| | | 32 | | −85.370 | 12.000 | | | |
| | | 33 | | INF | 27.000 | 1.84666 | 23.8 | |
| | | 34 | | INF | 21.000 | 1.84666 | 23.8 | |
| | | 35 | | INF | 2.000 | 1.51680 | 64.2 | |
| | | 36 | | INF | 1.100 | 1.51680 | 64.2 | |

※ Aspheric surface
※※ Aspheric surface including a term of an odd-numbered order In the projection optical system 5 described above, the convex surface s2, s4 of the first lens G1 on the image side, the face (reflecting surface) s3 of the first lens G1 on the projection side, and the face s8 of the third lens G3 on the image side are formed as aspheric surfaces. Thus, the fourth-, sixth-, eighth- and tenth-order aspheric coefficients A4, A6, A8 and A10 of the faces in the numerical example 5 are indicated in Table 18 together with the conical constant "K".

Original data for the conditional expressions in the numerical value example 5 are illustrated in Table 19, and individual values relating to the original data are illustrated in Table 20.

TABLE 19

| f(all) | 4.000 |
|---|---|
| φ1 | −0.0109644 |

TABLE 18

| | K | A4 | A6 | A8 | A10 |
|---|---|---|---|---|---|
| S2, S4 | −8.07721 | | | | |
| S3 | −8.07974 | −3.67539E−10 | 7.47650E−15 | −4.70348E−20 | 1.08528E−25 |
| S8 | −0.68911 | 2.73512E−06 | 1.11794E−09 | 3.68257E−13 | 1.66269E−15 |

TABLE 19-continued

| | |
|---|---|
| φ2 | −0.0196815 |
| φ12 | −0.1586264 |
| φ3 | 0.0135381 |
| φ4 | 0.0220522 |
| φ34 | −0.0014364 |
| T23 | 7.60900 |
| Tmax | 36.38923 |
| T0 | 15.00000 |
| TASr | −0.39787 |
| TAS2 | 0.53319 |
| SASr | −0.20109 |
| SAS2 | 0.31967 |

TABLE 20

| | |
|---|---|
| f(all) · \|φ1\| | 0.04386 |
| φ1/φ2 | 0.55709 |
| \|φ12\|/φ3 | 11.71704 |
| \|φ2\|/T23 | 0.02085 |
| fall · φ12 | −0.063451 |
| fall · φ34 | −0.00575 |
| Tmax/T0 | 2.42595 |
| TAS2 + TASr | 0.13532 |
| SAS2 + SASr | 0.11858 |
| kr | −8.07721 |
| Kt | −8.07974 |
| kr/kt | 0.99969 |
| A3R | (—) |
| A3T | (—) |
| A3(2) | (—) |
| ΔP | 3.20(G9, G11, G12) |
| ν(⌥) | 81.6(G9, G11, G12) |

FIG. 10 illustrates the spherical aberration, astigmatism and distortion aberration of the numerical value example 5. It is to be noted that, in the diagram of the spherical aberration, a solid line indicates an aberration curve at the g-line (wavelength: 435.8 nm), a broken line indicates an aberration curve at the d-line (wavelength: 587.6 nm) and an alternate long and short dash line indicates an aberration curve at the C-line (wavelength: 656.3 nm). In the diagram of the astigmatism, a solid line indicates a sagittal image surface, and a broken line indicates a meridional image surface. According to the projection optical system of the present embodiment, the spherical aberration, astigmatism and distortion aberration are corrected satisfactorily.

Figure 11:
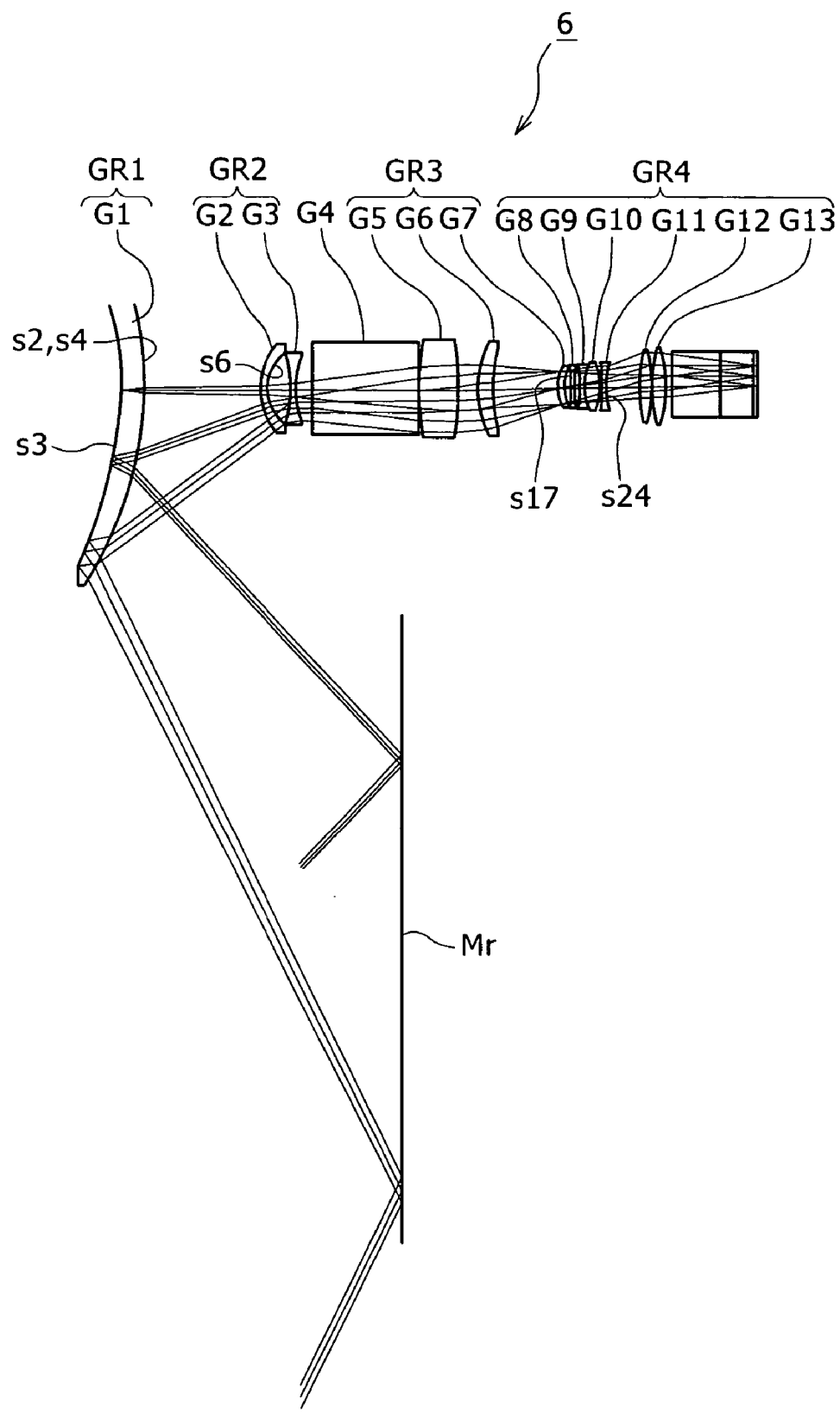
FIG. 11 is a schematic view showing a lens system of a projection optical system according to a sixth embodiment of the present invention.

FIG. 11 shows a lens system of the projection optical system 6 according to a sixth embodiment of the present invention.

Referring to FIG. 11, the projection optical system 6 shown includes a first lens group GR1 composed of a negative meniscus lens G1 having a concave surface directed to the projection side, a second lens group GR2 having a negative refracting power, a third lens group GR3 having a positive refracting power and a fourth lens group GR4 having a positive refracting power, disposed in order from the projection side. Further, a glass element G4 is interposed between the second lens group GR2 and the third lens group GR3. Thus, the projection optical system 6 has a lens configuration of the four-group retrofocus type.

The concave surface (face on the projection side) s3 of the negative meniscus lens G1 which composes the first lens group GR1 is formed as a reflecting surface having an aspherical shape, and a convex surface (face on the image side) s2, s4 of the negative meniscus lens G1 is formed as a refracting surface of an aspherical shape. The second lens group GR2 includes a second lens G2 in the form of a negative meniscus lens having a convex surface directed to the projection side and having a face on the image side formed as an aspheric surface and a third lens G3 in the form of a negative meniscus lens, disposed in order from the projection side. The third lens group GR3 includes a fifth lens G5 in the form of a positive lens, a sixth lens G6 in the form of a positive meniscus lens having a convex surface directed to the projection side, and a seventh lens G7 in the form of a positive meniscus lens having a convex surface directed to the projection side. The fifth to seventh lenses G5 to G7 are disposed in order from the projection side. The fourth lens group GR4 includes an eighth lens G8 in the form of a negative lens having a face on the projection side as an aspheric surface, a ninth lens G9 in the form of a negative lens, a tenth lens G10 in the form of a positive lens, an eleventh lens G11 in the form of a negative lens having a face on the image side as an aspheric surface, a twelfth lens G12 in the form of a positive lens, and a thirteenth lens G13 in the form of a positive lens, disposed in order from the projection side.

In the projection optical system 6 according to the present sixth embodiment, since the glass element G4 is interposed between the second lens group GR2 and the third lens group GR3, if a light path bending unit such as a prism is interposed in place of the glass element 4, then the light path can be bent. This makes it possible to reduce the depthwise dimension of the projection optical system 6, that is, the size of the projection optical system 6 in the projection direction. It is to be noted that the element for bending the light path to reduce the depthwise dimension of the projection optical system is not limited to a prism, but may be some other element such as, for example, a mirror.

A numerical value example 6 where the projection optical system 6 according to the sixth embodiment described above is embodied more particularly is indicated in Tables 21 to 24 and FIG. 12.

Table 21 indicates the radius of curvature, face distance, refractive index nd of the glass material at the d-line and Abbe number vd of the glass material at the d-line of each face together with the focal length "f(all)", F number and image height "y'" of the overall system. It is to be noted that the numerical value example 6 supposes that the projection optical system 6 is applied to a projector, and the reflecting surface of a rear surface mirror Mr positioned between the first lens G1 and a screen is determined as a first face and the other faces are individually numbered in order along the light path toward the image side. Accordingly, since a flux of light passes through the face of the first lens G1 on the image side twice, two face numbers (2 and 4) are applied to the face. It is to be noted that the 29th to 32nd faces are faces existing in an image formation section for forming an image to be projected on the screen by the projection optical system 6 and are listed for reference. Further, in Table 21, "INF" signifies a flat plane, and "✕" in a column next to the column of the face number signifies that the face is an aspheric surface while "✕·✕" signifies that the face is an aspheric surface which includes a term of an odd-numbered order. Further, an iris is represented by the face number "STOP".

TABLE 21 f(all) = 6.2
F number = 2.6
y' = 14.0

| Group | Lens | Si | | Radius of Curvature | Distance | Nd | vd | Surface |
|---|---|---|---|---|---|---|---|---|
| | | Object | | INF | 260.868 | | | |
| | | 1 | | INF | −185.008 | | | Reflection |
| First | G1 | 2 | ※ | −266.159 | −15.000 | 1.49744 | 56.1 | |
| Group | | 3 | ※ | −142.277 | 15.000 | 1.49744 | 56.1 | Reflection |
| | | 4 | ※ | −266.159 | 82.441 | | | |
| Second | G2 | 5 | | 48.709 | 2.967 | 1.52510 | 56.3 | |
| Group | | 6 | ※ | 25.121 | 19.049 | | | |
| | G3 | 7 | | −95.514 | 2.318 | 1.84666 | 23.8 | |
| | | 8 | | 46.558 | 12.948 | | | |
| | G4 | 9 | | INF | 75.000 | 1.51680 | 64.200 | |
| | | 10 | | INF | 0.234 | | | |
| Third | G5 | 11 | | 262.499 | 28.100 | 1.83400 | 37.3 | |
| Group | | 12 | | −193.693 | 13.655 | | | |
| | G6 | 13 | | 65.519 | 11.644 | 1.83400 | 37.3 | |
| | | 14 | | 155.375 | 48.383 | | | |
| | G7 | 15 | | 41.361 | 4.001 | 1.71300 | 53.9 | |
| | | 16 | | 69.312 | 0.100 | | | |
| | | STOP | | INF | 3.956 | | | |
| Fourth | G8 | 17 | ※ | −633.631 | 5.945 | 1.80610 | 40.7 | |
| Group | | 18 | | 65.188 | 2.825 | | | |
| | G9 | 19 | | −148.298 | 2.559 | 1.80518 | 25.5 | |
| | | 20 | | 68.982 | 0.507 | | | |
| | G10 | 21 | | 39.761 | 8.767 | 1.49700 | 81.6 | |
| | | 22 | | −28.923 | 0.107 | | | |
| | G11 | 23 | | −975.122 | 2.559 | 1.80610 | 40.7 | |
| | | 24 | ※ | 52.856 | 25.407 | | | |
| | G12 | 25 | | 109.232 | 8.203 | 1.49700 | 81.6 | |
| | | 26 | | −91.908 | 0.107 | | | |
| | G13 | 27 | | 117.155 | 9.268 | 1.49700 | 81.6 | |
| | | 28 | | −72.075 | 5.000 | | | |
| | | 29 | | INF | 35.500 | 1.51680 | 64.2 | |
| | | 30 | | INF | 23.000 | 1.84666 | 23.8 | |
| | | 31 | | INF | 1.000 | 1.46010 | 60.0 | |
| | | 32 | | INF | 0.700 | 1.51680 | 64.2 | |

※ Aspheric surface
※·※ Aspheric surface including a term of an odd-numbered order In the projection optical system 6 described above, the convex surface s2, s4 of the first lens G1 on the image side, the face (reflecting surface) s3 of the first lens G1 on the projection side, the face s6 of the second lens G2 on the image side, the face s17 of the eighth lens G8 on the projection side and the face s24 of the eleventh lens G11 on the image side are formed as aspheric surfaces. Thus, the third-, fourth-, fifth-, sixth-, eighth- and tenth-order aspheric coefficients A3, A4, A5, A6, A8 and A10 of the faces in the numerical example 6 are indicated in Table 22 together with the conical constant "K".

Original data for the conditional expressions in the numerical value example 6 are illustrated in Table 23, and individual values relating to the original data are illustrated in Table 24.

TABLE 23

| f(all) | 6.200 |
|---|---|
| φ1 | −0.0166009 |
| φ2 | −0.0416130 |
| φ12 | −0.1331352 |
| φ3 | 0.0148842 |

TABLE 22

| | K | A3 | A4 | A5 | A6 | A8 | A10 |
|---|---|---|---|---|---|---|---|
| S2.S4 | 1.80442 | | −5.90468E−08 | | 5.65345E−12 | −7.83526E−17 | |
| S3 | −11.30000 | 2.46530E−07 | −4.39970E−08 | 1.52730E−13 | 1.99250E−12 | −1.91090E−19 | −1.43430E−21 |
| S6 | −1.42191 | | 7.55135E−06 | | −2.45815E−10 | 3.08865E−13 | −7.07439E−15 |
| S17 | 0 | | −5.86994E−06 | | 6.83655E−10 | −5.54734E−11 | 1.56926E−13 |
| S24 | 1.90786 | | 3.29145E−06 | | 2.60907E−09 | −4.14998E−12 | 5.84924E−14 |

TABLE 23-continued

| | |
|---|---|
| φ4 | 0.0178671 |
| φ34 | 0.0001573 |
| T23 | 62.62820 |
| Tmax | 7.70056 |
| T0 | 15.00000 |
| TASr | |
| TAS2 | |
| SASr | |
| SAS2 | |

TABLE 24

| | |
|---|---|
| f(all) · \|φ1\| | 0.10293 |
| φ1/φ2 | 0.39894 |
| \|φ12\|/φ3 | 8.94473 |
| \|φ2\|/T23 | 0.00213 |
| fall · φ12 | −0.82544 |
| fall · φ34 | 0.00098 |
| Tmax/T0 | 0.51337 |
| TAS2 + TASr | (—) |
| SAS2 + SASr | (—) |
| kr | −11.30000 |
| kt | 1.80442 |
| kr/kt | −6.26240 |
| A3R | 2.46530E-07 |
| A3T | (—) |
| A3(2) | (—) |
| ΔP | 3.20(G9, G11, G12) |
| ν(凸) | 81.6(G9, G11, G12) |

FIG. 12 illustrates the spherical aberration, astigmatism and distortion aberration of the numerical value example 6. It is to be noted that, in the diagram of the spherical aberration, a solid line indicates an aberration curve at the g-line (wavelength: 435.8 nm), a broken line indicates an aberration curve at the d-line (wavelength: 587.6 nm) and an alternate long and short dash line indicates an aberration curve at the C-line (wavelength: 656.3 nm). In the diagram of the astigmatism, a solid line indicates a sagittal image surface, and a broken line indicates a meridional image surface. According to the projection optical system of the present embodiment, the spherical aberration, astigmatism and distortion aberration are corrected satisfactorily.

Figure 13:
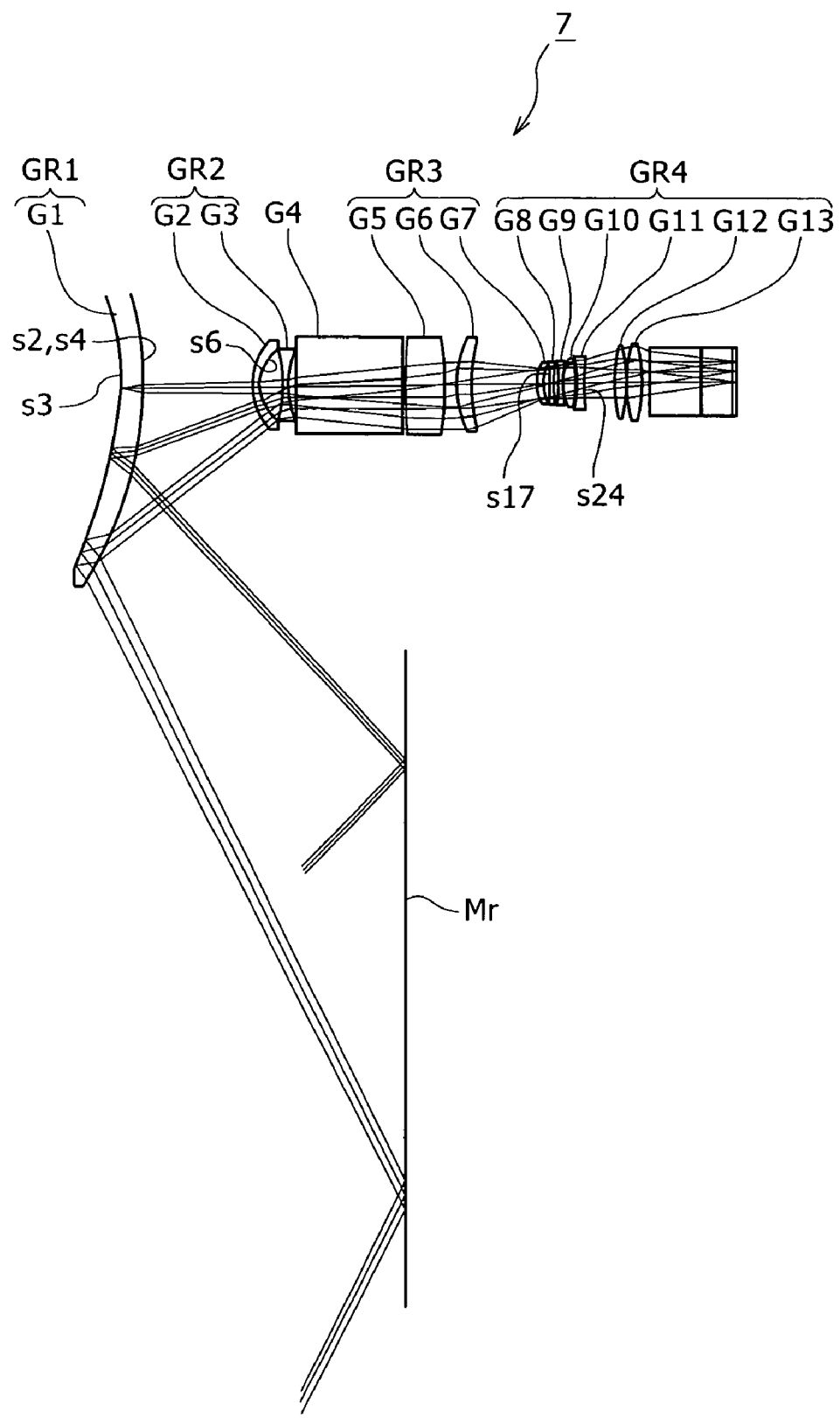
FIG. 13 is a schematic view showing a lens system of a projection optical system according to a seventh embodiment of the present invention.

FIG. 13 shows a lens system of the projection optical system 7 according to a seventh embodiment of the present invention.

Referring to FIG. 13, the projection optical system 7 shown includes a first lens group GR1 composed of a negative meniscus lens G1 having a concave surface directed to the projection side, a second lens group GR2 having a negative refracting power, a third lens group GR3 having a positive refracting power and a fourth lens group GR4 having a positive refracting power, disposed in order from the projection side. Further, a glass element G4 is interposed between the second lens group GR2 and the third lens group GR3. Thus, the projection optical system 7 has a lens configuration of the four-group retrofocus type.

The concave surface (face on the projection side) s3 of the negative meniscus lens G1 which composes the first lens group GR1 is formed as a reflecting surface having an aspherical shape, and a convex surface (face on the image side) s2, s4 of the negative meniscus lens G1 is formed as a refracting surface of an aspherical shape. The second lens group GR2 includes a second lens G2 in the form of a negative meniscus lens having a convex surface directed to the projection side and having a face on the image side formed as an aspheric surface and a third lens G3 in the form of a negative meniscus lens, disposed in order from the projection side. The third lens group GR3 includes a fifth lens G5 in the form of a positive lens, a sixth lens G6 in the form of a positive meniscus lens having a convex surface directed to the projection side, and a seventh lens G7 in the form of a positive meniscus lens having a convex surface directed to the projection side. The fifth to seventh lenses G5 to G7 are disposed in order from the projection side. The fourth lens group GR4 includes an eighth lens G8 in the form of a negative lens having a face on the projection side as an aspheric surface, a ninth lens G9 in the form of a negative lens, a tenth lens G10 in the form of a positive lens, an eleventh lens G11 in the form of a negative lens having a face on the image side as an aspheric surface, a twelfth lens G12 in the form of a positive lens, and a thirteenth lens G13 in the form of a positive lens, disposed in order from the projection side.

In the projection optical system 7 according to the present seventh embodiment, since the glass element G4 is interposed between the second lens group GR2 and the third lens group GR3, if a light path bending unit such as a prism is interposed in place of the glass element 4, then the light path can be bent. This makes it possible to reduce the depthwise dimension of the projection optical system 7, that is, the size of the projection optical system 7 in the projection direction. It is to be noted that the element for bending the light path to reduce the depthwise dimension of the projection optical system is not limited to a prism, but may be some other element such as, for example, a mirror.

A numerical value example 7 where the projection optical system 7 according to the seventh embodiment described above is embodied more particularly is indicated in Tables 25 to 28 and FIG. 14.

Table 25 indicates the radius of curvature, face distance, refractive index nd of the glass material at the d-line and Abbe number vd of the glass material at the d-line of each face together with the focal length "f(all)", F number and image height "y'" of the overall system. It is to be noted that the numerical value example 7 supposes that the projection optical system 7 is applied to a projector, and the reflecting surface of a rear surface mirror Mr positioned between the first lens G1 and a screen is determined as a first face and the other faces are individually numbered in order along the light path toward the image side. Accordingly, since a flux of light passes through the face of the first lens G1 on the image side twice, two face numbers (2 and 4) are applied to the face. It is to be noted that the 29th to 32nd faces are faces existing in an image formation section for forming an image to be projected on the screen by the projection optical system 7 and are listed for reference. Further, in Table 25, "INF" signifies a flat plane, and "X" in a column next to the column of the face number signifies that the face is an aspheric surface while "X·X" signifies that the face is an aspheric surface which includes a term of an odd-numbered order. Further, an iris is represented by the face number "STOP".

TABLE 25 f(all) = 6.2
F number = 2.6
y' = 14.0

| Group | Lens | Si | | Radius of Curvature | Distance | Nd | vd | Surface |
|---|---|---|---|---|---|---|---|---|
| | | Object | | INF | 262.299 | | | |
| | | 1 | | INF | −185.008 | | | Reflection |
| First | G1 | 2 | ✴ | −267.253 | −15.000 | 1.49744 | 56.1 | |
| Group | | 3 | ✴✴ | −138.885 | 15.000 | 1.49744 | 56.1 | Reflection |
| | | 4 | ✴ | −267.253 | 77.611 | | | |
| Second | G2 | 5 | | 50.860 | 2.967 | 1.52510 | 56.3 | |
| Group | | 6 | ✴✴ | 25.176 | 18.562 | | | |
| | G3 | 7 | | −89.818 | 2.318 | 1.84666 | 23.8 | |
| | | 8 | | 46.962 | 6.873 | | | |
| | G4 | 9 | | INF | 75.000 | 1.51680 | 64.2 | |
| | | 10 | | INF | 0.798 | | | |
| Third | G5 | 11 | | 390.748 | 28.100 | 1.83400 | 37.3 | |
| Group | | 12 | | −158.706 | 8.785 | | | |
| | G6 | 13 | | 67.560 | 11.641 | 1.83400 | 37.3 | |
| | | 14 | | 199.972 | 50.481 | | | |
| | G7 | 15 | | 48.484 | 2.203 | 1.71300 | 53.9 | |
| | | 16 | | 68.276 | 0.100 | | | |
| | | STOP | | INF | 3.499 | | | |
| Fourth | G8 | 17 | ✴ | −1003.771 | 5.945 | 1.80610 | 40.7 | |
| Group | | 18 | | 89.902 | 2.825 | | | |
| | G9 | 19 | | −101.483 | 2.559 | 1.80518 | 25.5 | |
| | | 20 | | 94.367 | 0.507 | | | |
| | G10 | 21 | | 47.471 | 8.767 | 1.49700 | 81.6 | |
| | | 22 | | −27.544 | 0.107 | | | |
| | G11 | 23 | | −608.795 | 2.559 | 1.80610 | 40.7 | |
| | | 24 | ✴ | 57.288 | 25.407 | | | |
| | G12 | 25 | | 118.211 | 8.203 | 1.49700 | 81.6 | |
| | | 26 | | −88.317 | 0.107 | | | |
| | G13 | 27 | | 124.658 | 9.268 | 1.49700 | 81.6 | |
| | | 28 | | −70.721 | 5.000 | | | |
| | | 29 | | INF | 35.500 | 1.51680 | 64.2 | |
| | | 30 | | INF | 23.000 | 1.84666 | 23.8 | |
| | | 31 | | INF | 1.000 | 1.46010 | 60.0 | |
| | | 32 | | INF | 0.700 | 1.51680 | 64.2 | |

✴ Aspheric surface
✴✴ Aspheric surface including a term of an odd-numbered order In the projection optical system 7 described above, the convex surface s2, s4 of the first lens G1 on the image side, the face (reflecting surface) s3 of the first lens G1 on the projection side, the face s6 of the second lens G2 on the image side, the face s17 of the eighth lens G8 on the projection side and the face s24 of the eleventh lens G11 on the image side are formed as aspheric surfaces. Thus, the third-, fourth-, fifth-, sixth-, eighth- and tenth-order aspheric coefficients A3, A4, A5, A6, A8 and A10 of the faces in the numerical example 7 are indicated in Table 26 together with the conical constant "K".

Original data for the conditional expressions in the numerical value example 7 are illustrated in Table 27, and individual values relating to the original data are illustrated in Table 28.

TABLE 27

| f(all) | 6.200 |
|---|---|
| φ1 | −0.0171139 |
| φ2 | −0.0426503 |
| φ12 | −0.1350289 |
| φ3 | 0.0154177 |

TABLE 26

| | K | A3 | A4 | A5 | A6 | A8 | A10 |
|---|---|---|---|---|---|---|---|
| S2,S4 | 1.82652 | | −5.30977E−08 | | 5.67083E−12 | −8.37370E−17 | |
| S3 | −11.94000 | 4.06290E−07 | −4.29420E−08 | 3.44590E−12 | 1.99560E−12 | −1.09020E−18 | −1.49110E−21 |
| S6 | −1.60550 | 2.13760E−05 | 7.80890E−06 | 5.16450E−08 | −1.06380E−09 | 7.58070E−13 | −8.64420E−15 |
| S17 | 0 | | −6.18852E−05 | | −3.23138E−09 | −5.51008E−11 | 1.54364E−13 |
| S24 | 1.940023 | | 3.35660E−06 | | 1.70627E−09 | −6.32274E−12 | 3.80912E−14 |

TABLE 27-continued

| | |
|---|---|
| φ4 | 0.0183937 |
| φ34 | 0.0000281 |
| T23 | 57.11720 |
| Tmax | 8.37451 |
| T0 | 15.00000 |
| TASr | |
| TAS2 | |
| SASr | |
| SAS2 | |

TABLE 28

| | |
|---|---|
| f(all) · |φ1| | 0.10611 |
| φ1/φ2 | 0.40126 |
| φ12/φ3 | 8.75804 |
| φ2/T23 | 0.00236 |
| fall · φ12 | −0.83718 |
| fall · φ34 | 0.00017 |
| Tmax/T0 | 0.55830 |
| TAS2 + TASr | (—) |
| SAS2 + SASr | (—) |
| kr | −11.94000 |
| kt | 1.82652 |
| kr/kt | −6.53702 |
| A3R | 4.06280E−07 |
| A3T | (—) |
| A3(2) | 2.13760E−05 |
| ΔP | 3.20(G10, G12, G13) |
| ν(凸) | 81.6(G10, G12, G13) |

FIG. 14 illustrates the spherical aberration, astigmatism and distortion aberration of the numerical value example 7. It is to be noted that, in the diagram of the spherical aberration, a solid line indicates an aberration curve at the g-line (wavelength: 435.8 nm), a broken line indicates an aberration curve at the d-line (wavelength: 587.6 nm) and an alternate long and short dash line indicates an aberration curve at the C-line (wavelength: 656.3 nm). In the diagram of the astigmatism, a solid line indicates a sagittal image surface, and a broken line indicates a meridional image surface. According to the projection optical system of the present embodiment, the spherical aberration, astigmatism and distortion aberration are corrected satisfactorily.

Figure 15:
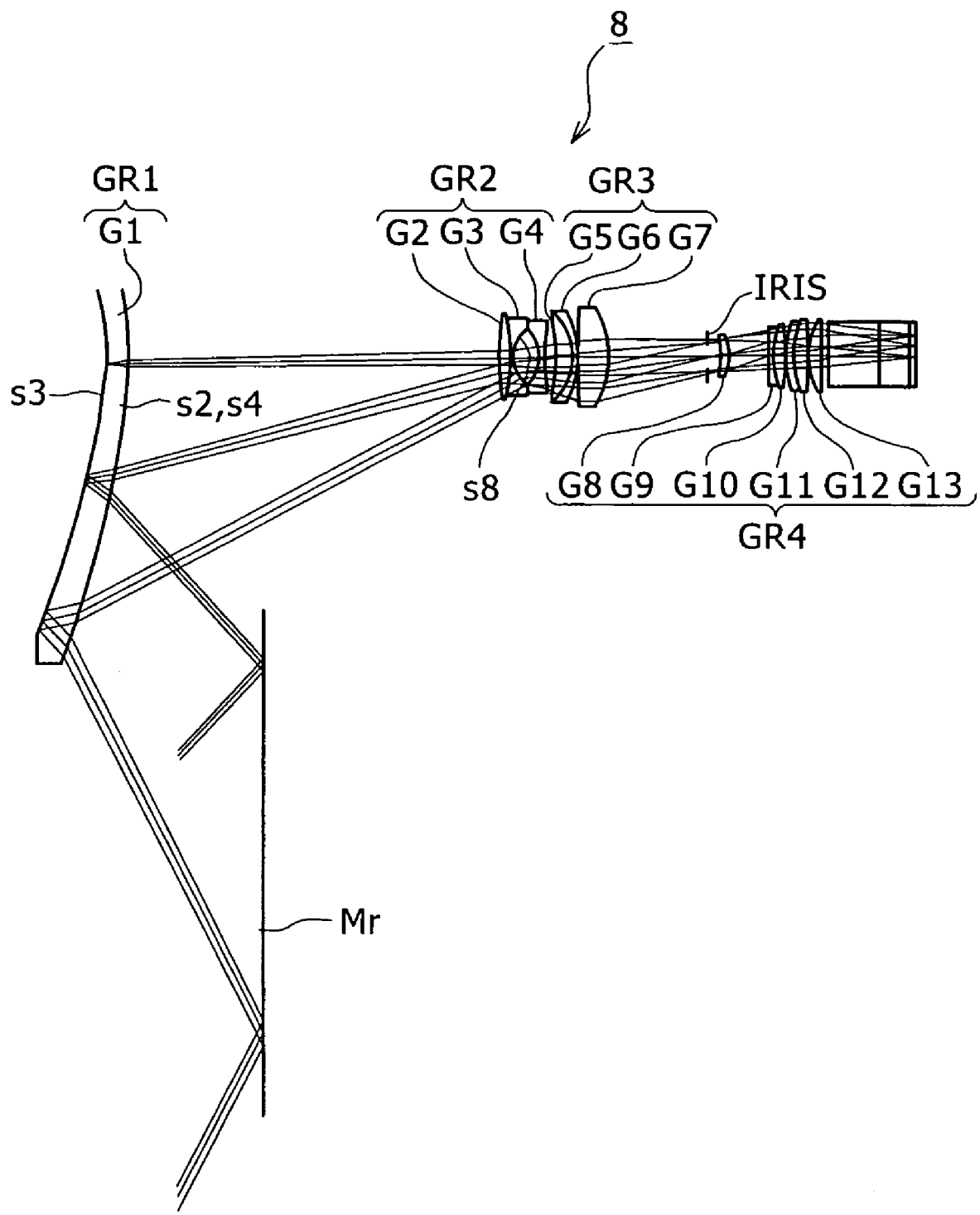
FIG. 15 is a schematic view showing a lens system of a projection optical system according to an eighth embodiment of the present invention.

FIG. 15 shows a lens system of the projection optical system 8 according to an eighth embodiment of the present invention.

Referring to FIG. 15, the projection optical system 8 shown includes a first lens group GR1 composed of a negative meniscus lens G1 having a concave surface directed to the projection side, a second lens group GR2 having a negative refracting power, a third lens group GR3 having a positive refracting power and a fourth lens group GR4 having a positive refracting power, disposed in order from the projection side. Thus, the projection optical system 8 has a lens configuration of the four-group retrofocus type. Particularly, a great air gap is provided between the third lens group GR3 and the fourth lens group GR4.

The concave surface (face on the projection side) s3 of the negative meniscus lens G1 which composes the first lens group GR1 is formed as a reflecting surface having an aspherical shape, and a convex surface (face on the image side) s2, s4 of the negative meniscus lens G1 is formed as a refracting surface of an aspherical shape. The second lens group GR2 includes a second lens G2 in the form of a positive lens, a third lens G3 in the form of a negative lens having a face on the image side formed as an aspheric surface, and a fourth lens G4 in the form of a negative lens, disposed in order from the projection side. The third lens group GR3 includes a cemented lens including a fifth lens G5 in the form of a positive meniscus lens having a concave surface directed to the projection side and a sixth lens G6 in the form of a negative meniscus lens having a concave surface directed to the projection side, and a seventh lens G7 in the form of a positive lens, disposed in order from the projection side. The fourth lens group GR4 includes an eighth lens G8 in the form of a positive meniscus lens having a convex surface directed to the projection side, a ninth lens G9 in the form of a negative meniscus lens having a convex surface directed to the projection side, a tenth lens G10 in the form of a positive lens, an eleventh lens G11 in the form of a negative meniscus lens having a convex surface directed to the projection side, a twelfth lens G12 in the form of a positive lens, and a thirteenth lens G13 in the form of a positive lens, disposed in order from the projection side.

In the present projection optical system 8, it is possible to insert a light path bending unit such as a prism into the great air gap between the third lens group GR3 and the fourth lens group GR4, and this makes it possible to reduce the depth-wise dimension of the projection optical system 8.

A numerical value example 8 where the projection optical system 8 according to the eighth embodiment described above is embodied more particularly is indicated in Tables 29 to 32 and FIG. 16.

Table 29 indicates the radius of curvature, face distance, refractive index nd of the glass material at the d-line and Abbe number νd of the glass material at the d-line of each face together with the focal length "f(all)", F number and image height "y" of the overall system. It is to be noted that the numerical value example 8 supposes that the projection optical system 8 is applied to a projector, and the reflecting surface of a rear surface mirror Mr positioned between the first lens G1 and a screen is determined as a first face and the other faces are individually numbered in order along the light path toward the image side. Accordingly, since a flux of light passes through the face of the first lens G1 on the image side twice, two face numbers (2 and 4) are applied to the face. It is to be noted that the 28th to 31st faces are faces existing in an image formation section for forming an image to be projected on the screen by the projection optical system 8 and are listed for reference. Further, in Table 29, "INF" signifies a flat plane, and "X" in a column next to the column of the face number signifies that the face is an aspheric surface while "X·X" signifies that the face is an aspheric surface which includes a term of an odd-numbered order. Further, an iris is represented by the face number "STOP".

TABLE 29 f(all) = 6.050
F number = 2.8
y' = 14.0

| Group | Lens | Si | | Radius of curvature | Distance | Nd | vd | Surface |
|---|---|---|---|---|---|---|---|---|
| | | Object | | INF | 307.445 | | | |
| | | 1 | | INF | −100.000 | | | Reflection |
| First | G1 | 2 | ※※ | −324.572 | −15.000 | 1.49744 | 56.1 | |
| Group | | 3 | ※ | −198.369 | 15.000 | 1.49744 | 56.1 | Reflection |
| | | 4 | ※※ | −324.572 | 265.143 | | | |
| Second | G2 | 5 | | 334.600 | 6.603 | 1.62602 | 57.3 | |
| Group | | 6 | | −253.315 | 0.500 | | | |
| | G3 | 7 | | −777.142 | 2.559 | 1.52510 | 56.3 | |
| | | 8 | ※ | 28.105 | 17.648 | | | |
| | G4 | 9 | | −34.777 | 4.265 | 1.79362 | 22.8 | |
| | | 10 | | 166.767 | 7.100 | | | |
| Third | G5 | 11 | | −188.069 | 12.752 | 1.84888 | 32.6 | |
| Group | G6 | 12 | | −45.463 | 3.199 | 1.53738 | 64.3 | |
| | | 13 | | −68.287 | 0.107 | | | |
| | G7 | 14 | | 289.215 | 23.329 | 1.77121 | 47.8 | |
| | | 15 | | −75.944 | 75.281 | | | |
| | | STOP | | INF | 6.107 | | | |
| Fourth | G8 | 16 | | 278.502 | 3.227 | 1.79850 | 22.6 | |
| Group | | 17 | ※ | 2026.526 | 31.639 | | | |
| | G9 | 18 | | 3967.637 | 2.559 | 1.84754 | 26.7 | |
| | | 19 | | 57.898 | 1.300 | | | |
| | G10 | 20 | | 58.173 | 8.767 | 1.48749 | 70.4 | |
| | | 21 | | −85.543 | 0.107 | | | |
| | G11 | 22 | | 100.347 | 2.559 | 1.80610 | 40.7 | |
| | | 23 | | 56.437 | 2.816 | | | |
| | G12 | 24 | ※ | 67.016 | 8.203 | 1.49700 | 81.6 | |
| | | 25 | | −159.107 | 0.107 | | | |
| | G13 | 26 | | 49.191 | 9.268 | 1.49700 | 81.6 | |
| | | 27 | | −391.056 | 5.000 | | | |
| | | 28 | | INF | 35.500 | 1.51680 | 64.2 | |
| | | 29 | | INF | 23.000 | 1.84666 | 23.8 | |
| | | 30 | | INF | 1.000 | 1.46010 | 60.0 | |
| | | 31 | | INF | 0.700 | 1.51680 | 64.2 | |

※ Aspheric surface
※※ Aspheric surface including a term of an odd-numbered order In the projection optical system 8 described above, the convex surface s2, s4 of the first lens G1 on the image side, the face (reflecting surface) s3 of the first lens G1 on the projection side, and the face s8 of the third lens G3 on the image side are formed as aspheric surfaces. Thus, the third-, fourth-, fifth-, sixth-, eighth- and tenth-order aspheric coefficients A3, A4, A5, A6, A8 and A10 of the faces in the numerical example 8 are indicated in Table 30 together with the conical constant "K".

TABLE 30

| | K | A3 | A4 | A5 | A6 | A8 | A10 |
|---|---|---|---|---|---|---|---|
| S2,S4 | −3.92950 | 1.80590E−06 | −2.00220E−09 | −2.48710E−12 | −1.90240E−15 | 1.81240E−19 | |
| S3 | −8.75716 | | 9.65845E−10 | | 8.29949E−15 | −1.37529E−19 | 1.27873E−24 |
| S8 | 0.01974 | | −5.48037E−07 | | −5.44242E−09 | 7.89234E−12 | −1.65545E−14 |

Original data for the conditional expressions in the numerical value example 8 are illustrated in Table 31, and individual values relating to the original data are illustrated in Table 32.

TABLE 31

| f(all) | 6.050 |
|---|---|
| φ1 | −0.0116194 |

TABLE 31-continued

| φ2 | −0.0495316 |
|---|---|
| φ12 | −0.2293637 |
| φ3 | 0.0219756 |
| φ4 | −0.0168996 |
| φ34 | −0.0136142 |
| T23 | 7.10000 |

TABLE 31-continued

| Tmax | 18.88650 |
|---|---|
| T0 | 15.00000 |
| TASr | (—) |
| TAS2 | (—) |
| SASr | (—) |
| SAS2 | (—) |

TABLE 32

| | |
|---|---|
| f(all) · \|φ1\| | 0.07030 |
| φ1/φ2 | 0.23459 |
| \|φ12\|/φ3 | 10.43720 |
| φ2\|/T23 | 0.03230 |
| fall · φ12 | −1.38765 |
| fall · φ34 | −0.08237 |
| Tmax/T0 | 1.25910 |
| TAS2 + TASr | (—) |
| SAS2 + SASr | (—) |
| kr | −8.75716 |
| kt | −3.92950 |
| kr/kt | 2.22857 |
| A3R | (—) |
| A3T | 1.80590E−06 |
| A3(2) | (—) |
| ΔP | 0.45(G10), 3.20(G12, G13) |
| ν(凸) | 70.4(G10), 81.6(G12, G13) |

FIG. 16 illustrates the spherical aberration, astigmatism and distortion aberration of the numerical value example 8. It is to be noted that, in the diagram of the spherical aberration, a solid line indicates an aberration curve at the g-line (wavelength: 435.8 nm), a broken line indicates an aberration curve at the d-line (wavelength: 587.6 nm) and an alternate long and short dash line indicates an aberration curve at the C-line (wavelength: 656.3 nm). In the diagram of the astigmatism, a solid line indicates a sagittal image surface, and a broken line indicates a meridional image surface. According to the projection optical system of the present embodiment, the spherical aberration, astigmatism and distortion aberration are corrected satisfactorily.

As can be recognized from the foregoing description, in all of the numerical value examples described above, the conditional expressions (1) to (10) are satisfied, and various aberrations are corrected satisfactorily and miniaturization of the apparatus is achieved.

It is to be noted that, in the embodiments described above, lenses only of the refraction type which deflect incoming ray by refraction (that is, a lens of the type which causes deflection of light at an interface between different media having different refractive indices) are used except the reflecting surface. However, the lenses which can be used in the present invention are not limited to those of the refraction type, but various types of lenses can be applied. For example, lenses of the diffraction type which deflect an incident ray by diffraction, lenses of the refraction and diffraction hybrid type which deflect an incident ray by a combination of a diffraction action and a refraction action, lenses of the refractive index distribution type which deflect an incident ray depending upon the refractive index distribution in a medium and other lenses may be used.

The original data and the numerical values of the conditional expressions in the numerical value examples described hereinabove are listed collectively in Table 33.

TABLE 33

| Item | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| fall | 0.292 | 0.100 | 3.750 | 6.315 | 4.000 | 6.200 | 6.200 | 6.050 |
| φ1 | −0.01082 | −0.01265 | −0.01523 | −0.1710 | −0.01095 | −0.01660 | −0.01711 | −0.012 |
| φ2 | −0.0404 | −0.004889 | −0.02670 | −0.04236 | −0.0156 | −0.04161 | −0.04265 | −0.050 |
| φ12 | −0.10460 | −0.18011 | −0.19469 | −0.13078 | −0.15863 | −0.13314 | −0.13503 | −0.239 |
| φ3 | 0.01039 | 0.01633 | 0.01357 | 0.1450 | 0.01354 | 0.01488 | 0.01542 | 0.022 |
| φ4 | 0.01462 | 0.01849 | 0.02011 | 0.01150 | 0.0265 | 0.01787 | 0.01839 | 0.017 |
| φ34 | −0.00245 | −0.01397 | −0.00772 | 0.00000 | −0.00144 | 0.00016 | 0.00003 | −0.014 |
| T23 | 86.694 | 20.759 | 6.148 | 60.437 | 7.609 | 62.628 | 57.117 | 9.100 |
| Tmax | 7.531 | 16.500 | 15.000 | 8.009 | 36.389 | 7.701 | 8.325 | 18.687 |
| T0 | 15.000 | 15.000 | 15.000 | 15.000 | 15.000 | 15.000 | 15.000 | 15.000 |
| kt | 2.96170 | 2.67624 | −5.36229 | 1.75803 | −8.02574 | 1.00043 | 1.52652 | −1.930 |
| TASr | −0.5637 | −0.69555 | −0.683194 | −0.09198 | −0.19989 | (—) | (—) | (—) |
| TAS2 | 0.00077 | 0.59556 | 0.39244 | 0.14926 | −0.53319 | (—) | (—) | (—) |
| SASr | −0.26402 | −0.21786 | −0.34320 | −0.41931 | −0.20103 | (—) | (—) | (—) |
| SAS2 | 0.16562 | 0.44142 | 0.42702 | 0.22245 | 0.31969 | (—) | (—) | (—) |

| Conditional expression | Lower limit value | Upper limit value | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|---|
| (1) fall · \|φ1\| | 0.0 | 0.3 | 0.06808 | 0.7715 | 0.05711 | 0.10796 | 0.04386 | 0.10293 | 0.10611 | 0.07030 |
| (2) φ12/φ34 | 3.0 | 60.0 | 42.72145 | 12.89083 | 14.34595 | 8.9595 | 0.06386 | 0.10251 | 0.30611 | 0.07020 |
| (3) fall · φ12 | −2.0 | −0.2 | −0.65614 | −1.69666 | −0.73008 | −0.62586 | −0.02544 | −0.53718 | −1.19769 | |
| (4) Tmax/Tn | 0.1 | 5.0 | 0.50207 | 1.08000 | 0.9999 | 0.53394 | 2.42595 | 0.51337 | 0.55830 | 1.25910 |
| (5) kr | −30.0 | 0.0 | −16.60312 | −12.16095 | −6.44300 | −12.92508 | −8.07731 | −11.10000 | −11.01000 | −6.75716 |
| (6) tr | −15.0 | 4.0 | 2.95170 | 1.87674 | −5.36315 | −1.75803 | −0.07074 | 1.00643 | 1.62652 | −3.989550 |
| (7) A3R | 0.0E+00 | 1.0E−12 | (—) | (—) | (—) | (—) | (—) | 2.465E−07 | 4.00629E−07 | (—) |
| (8) A3T | 0.0E+00 | 1.0E−12 | (—) | (—) | (—) | (—) | (—) | (—) | (—) | 1.80590E−04 |
| (9) ΔP | 0.3 | 6.0 | 3.20(G9, G11, G12) | 3.20(G9, G11, G12) | 3.20(G12, G14, G15) | 3.20(G9, G11, G12) | 3.20(G9, G11, G12) | 3.20(G9, G11, G12) | 3.20(G10, G12, G13) | 0.45(G10), 3.20(G12, G13) |
| (10) ν (凸) | 60 | 100 | 81.6(G9, G11, G12) | 81.6(G9, G11, G12) | 81.6(G9, G11, G15) | 81.6(G9, G11, G12) | 81.6(G9, G11, G12) | 81.6(G9, G11, G12) | 81.6(G9, G11, G13) | 70.4(G10), 81.6(G12, G13) |
| Use of aspheric surface for first group negative ⑦ surface | | | ○ | ○ | ○ | ○ | ○ | ○ | ○ | ○ |
| Number of aspheric surfaces of second group | | | 1 | 1 | 1 | 1 | 1 | 1 | 1 | 1 |

TABLE 33-continued

| | | | | | | | | |
|---|---|---|---|---|---|---|---|---|
| Number of aspheric surfaces of fourth group | 1 | 1 | 0 | 2 | 0 | 2 | 2 | 0 |
| Use of odd-numbered order aspheric surface for first group reflecting surface | (—) | (—) | (—) | (—) | (—) | ○ | ○ | (—) |
| Use of odd-numbered order aspheric surface for first group refracting surface | (—) | (—) | (—) | (—) | (—) | (—) | (—) | ○ |
| Use or odd-numbered order aspheric surface of second group | (—) | (—) | (—) | (—) | (—) | (—) | ○ | (—) |

Figure 17:
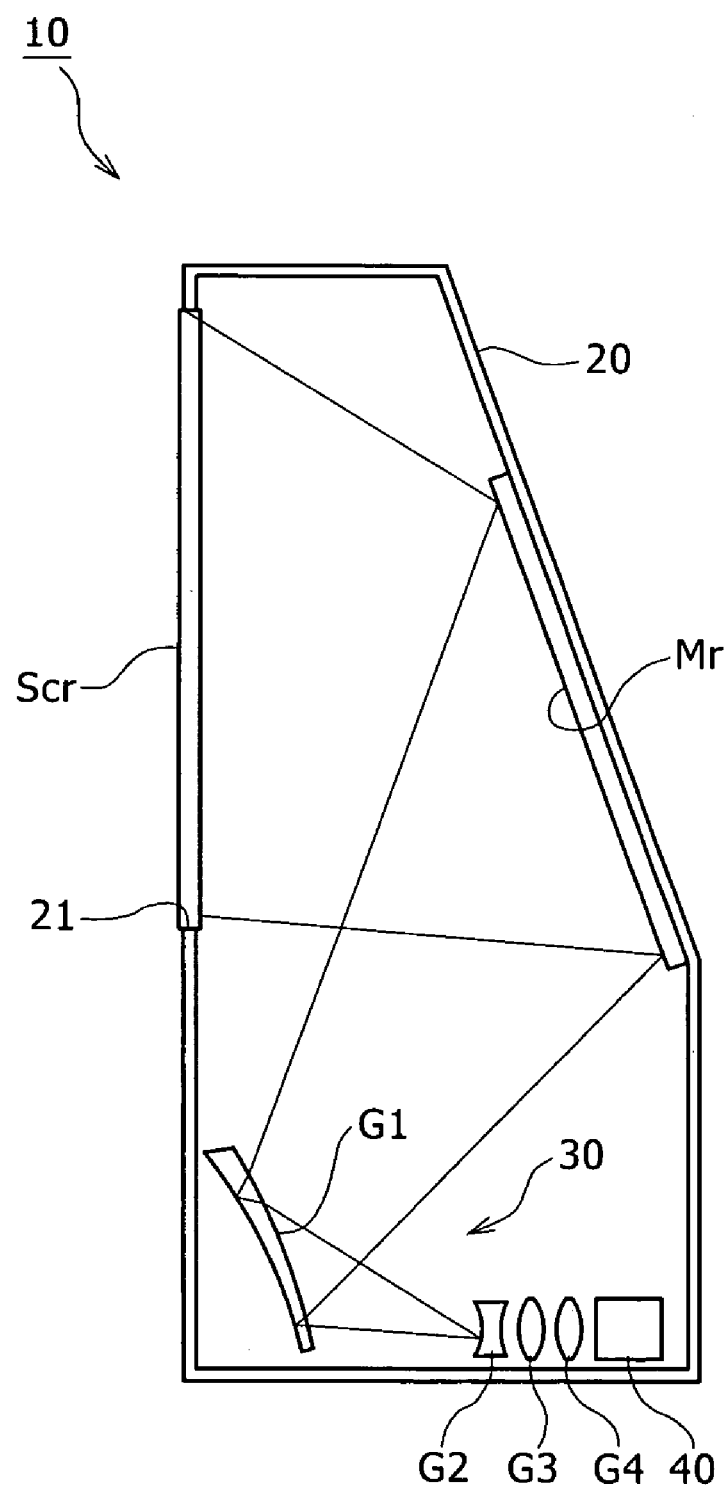
FIG. 17 is a schematic sectional view showing an image projection apparatus to which the present invention is applied.
Figure 18:
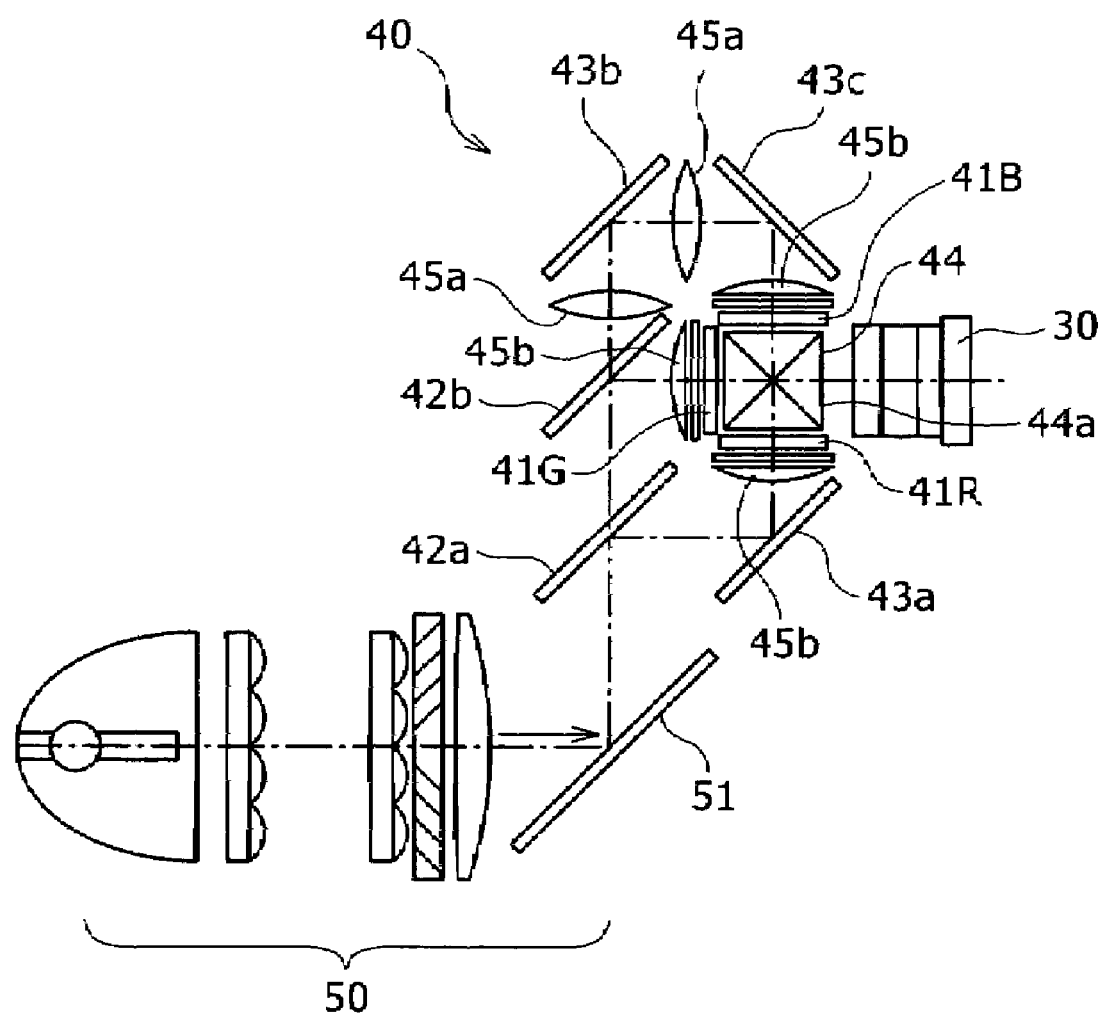
FIG. 18 is a schematic view showing an image formation section of the image projection apparatus of FIG. 17.

FIGS. 17 and 18 show an image projection apparatus to which the present invention is applied. The image projection apparatus is applied to a rear projection television set.

Referring to FIGS. 17 and 18, the rear projection television set 10 shown includes a housing 20 in which necessary parts, members and apparatus are disposed.

A large opening 21 is formed in a front wall of the housing 20 except a lower portion, and a transmission type screen Scr is disposed such that it closes up the opening 21. A total reflection mirror Mr is disposed at a rear portion in the housing 20 substantially in an opposing relationship to the transmission type screen Scr. A projection optical system 30 and an image formation section 40 are disposed at a lower portion in the housing 20. Light of an image formed by the image formation section 40 successively passes through lens groups GR2, GR3 and GR4 and is reflected in a wide angle toward the total reflection mirror Mr by a negative meniscus lens G1 of a first lens group GR1 of the projection optical system 30. The image light is further reflected by the total reflection mirror Mr and forms an image on the rear face of the transmission type screen Scr. Accordingly, the image formed by the image formation section 40 is projected in an enlarged scale on the transmission type screen Scr and can be enjoyed from the front of the transmission type screen Scr.

While the image formation section 40 may have any form only if it can form an image which can be projected by the projection optical system 30, an example of the image formation section 40 is shown in FIG. 18.

Referring to FIG. 18, the image formation section 40 is formed as a full color image formation section of the three-plate type including three liquid crystal panels, that is, an R liquid crystal panel 41R, a G liquid crystal panel 41G and a B liquid crystal panel 41B which are driven individually by image signals of three demultiplexed components of red (R), green (G) and blue (B).

The image formation section 40 includes a light source section 50 which emits white light in the form of a parallel light flux. The white light emitted from the light source section 50 is reflected by a total reflection mirror 51 and demultiplexed into an R component and a GB component by a dichroic mirror 42a. The GB component having passed through the dichroic mirror 42a is demultiplexed into a G component and a B component by another dichroic mirror 42b. The R component reflected by the dichroic mirror 42a is further reflected by a total reflection mirror 43a and passes through the R liquid crystal panel 41R and then enters a dichroic prism 44. The G component reflected by the dichroic mirror 42b passes through the G liquid crystal panel 41G and enters the dichroic prism 44. It is to be noted that the R component and the G component have an equal light path length.

The B component having passed through the dichroic mirror 42b is successively reflected by total reflection mirrors 43b and 43c, passes through the B liquid crystal panel 41B and enters the dichroic prism 44. It is to be noted that, since the B component has a path length longer than that of the R and G components, lenses 45a for the light path length adjustment are interposed between the dichroic mirror 42a and the total reflection mirror 43b and between the total reflection mirrors 43b and 43c, respectively. Further, condenser lenses 45b are disposed on the incident face side of the liquid crystal panels 41R, 41G and 41B, respectively.

The R, G and B components spatially modulated by the liquid crystal panels 41R, 41G and 41B are multiplexed by the dichroic prism 44 disposed such that color separation filters intersect with each other. Consequently, the R, G and B components are emitted as a single full-color image from an emergence face 44a and enter the projection optical system 30.

The full-color image is reproduced on the transmission type screen Scr in such a manner as described above.

It is to be noted that any one of the projection optical systems 1, 2, 3, 4, 5, 6, 7 and 8 according to the embodiments described hereinabove can be used as the projection optical system 30. Since any of the projection optical systems wherein the diameter of the aspherical reflecting surface is reduced is used, a lower portion (or an upper portion) of the screen of a rear projection television set can be lowered physically.

Figure 19:
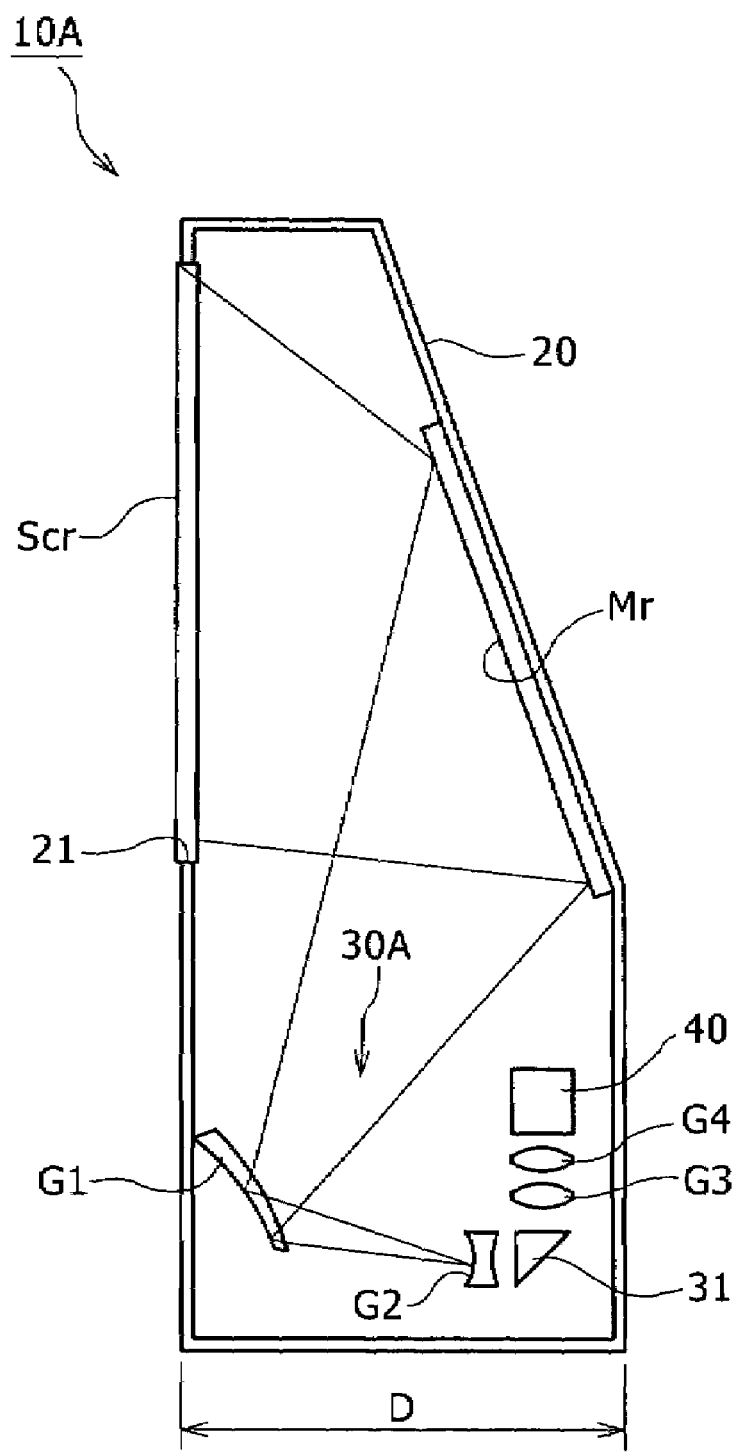
FIG. 19 is a schematic sectional view showing a modification to the image projection apparatus shown in FIG. 17.

FIG. 19 shows a modification 10A to the rear projection television set 10 described above. The rear projection television set 10A is different from the rear projection television set 10 in that a light path bending prism 31 is interposed in the light path of the projection optical system 30A.

The interposed arrangement of the light path bending prism 31 can decrease the depthwise dimension of the projection optical system 30A and consequently can decrease the depthwise dimension D of the rear projection television set 10A. Although the light path in the arrangement of FIG. 19 is bent in a vertical plane by the prism, the light path may be bent otherwise in a horizontal plane.

While the rear projection television set is described above as an example of an image projection apparatus, the application of the image projection apparatus of the present invention is not limited to a rear projection television set. Naturally, the image projection apparatus of the present invention can be applied to any image projection apparatus such as a front projector wherein an image is projected to a screen of the reflection type.

In summary, the present invention can be applied to an apparatus which projects an image, particularly to an image projection apparatus where there is a restriction to the distance between the apparatus and a projection plane although wide angle projection is demanded. In particular, for example, where the present invention is applied to a rear projection television set, reduction in thickness is easy. Meanwhile, where the present invention is applied to a front projector, even if there is a limitation to the place at which it is to be placed such as a small room, an image can be projected to a great screen.

While preferred embodiments of the present invention have been described using specific terms, such description is for illustrative purpose only, and it is to be understood that changes and variations may be made without departing from the spirit or scope of the following claims.

What is claimed is:

1. A projection optical system of the retrofocus type, comprising:
   a first lens group having a negative refracting power; and
   a second lens group having a negative refracting power;
   said first and second lens groups being arranged in order from a projection side, and
   said first lens group including a negative meniscus lens having a concave surface directed to the projection side and formed as an aspherical reflecting surface.

2. A projection optical system according to claim 1, further comprising:
   a third lens group having a positive refracting power; and
   a fourth lens group having a positive refracting power,
   said third and fourth lens groups being disposed in order toward an image side on the image side with respect to said second lens group, said first to fourth lens groups satisfying conditional expressions (1), (2), (3), (4) and (5):

$$0.02 < f(\text{all}) \cdot |\phi 1| < 0.3 \quad (1)$$

$$3.0 < \phi 12/\phi 34 < 60 \quad (2)$$

$$-2.0 < f(\text{all}) \cdot \phi 12 < -0.2 \quad (3)$$

$$0.1 < T\max/T0 < 5.0 \quad (4)$$

$$-30 < kr < 0 \quad (5)$$

where f(all) is a focal length of the projection optical system, $\phi 1$ is the refracting power of said first lens group, $\phi 2$ is the refracting power of said second lens group, $\phi 12$ is the composite refracting power of said first and second lens groups, $\phi 34$ is the composite refracting power of said third and fourth lens groups, Tmax is the thickness of said negative meniscus lens at a maximum image height in a direction parallel to an optical axis, T0 is the thickness of said negative meniscus lens on the axis, and kr is the aspheric conical constant of said aspherical reflecting surface.

3. The projection optical system according to claim 1, wherein said negative meniscus lens that composes said first lens group has an aspherical refracting surface and satisfies conditional expression (6):

$$-15.0 < kt < 15.0 \quad (6)$$

where kt is the aspheric conical constant of said aspherical refracting surface.

4. The projection optical system according to claim 2, wherein said negative meniscus lens that composes said first lens group has an aspherical refracting surface and satisfies conditional expression (6):

$$-15.0 < kt < 15.0 \quad (6)$$

where kt is the aspheric conical constant of said asperical refracting surface.

5. The projection optical system according to claim 1, wherein said aspherical reflecting surface of said negative meniscus lens of said first lens group includes a term of an odd-numbered order that satisfies conditional expression (7):

$$0.0 < A3R < 1.0 \times 10^{-12} \quad (7)$$

where A3R is a third order aspheric coefficient of said aspherical reflecting surface of said negative meniscus lens.

6. The projection optical system according to claim 2, wherein said aspherical reflecting surface of said negative meniscus lens of said first lens group includes a term of an odd-numbered order that satisfies conditional expression (7):

$$0.0 < A3R < 1.0 \times 10^{-12} \quad (7)$$

where A3R is the third order aspheric coefficient of said aspherical reflecting surface of said negative meniscus lens.

7. The projection optical system according to claim 1, wherein said aspherical reflecting surface of said negative meniscus lens of said first lens group includes a term of an odd-numbered order that satisfies conditional expression (8):

$$0.0 < A3T < 1.0 \times 10^{-12} \quad (8)$$

where A3T is the third order aspheric coefficient of said aspherical refracting surface of said negative meniscus lens.

8. The projection optical system according to claim 2, wherein said aspherical reflecting surface of said negative meniscus lens of said first lens group includes a term of an odd-numbered order that satisfies conditional expression (8):

$$0.0 < A3T < 1.0 \times 10^{-12} \quad (8)$$

where A3T is the third order aspheric coefficient of said aspherical refracting surface of said negative meniscus lens.

9. The projection optical system according to claim 1, wherein at least one face of a lens or lenses that compose said second lens group is formed with an aspheric surface.

10. The projection optical system according to claim 2, wherein at least one face of a lens or lenses that compose said second lens group is formed with an aspheric surface.

11. The projection optical system according to claim 1, wherein at least one face of a lens or lenses that compose said second lens group is formed with an aspheric surface including a term of an odd-numbered order.

12. The projection optical system according to claim 2, wherein at least one face of a lens or lenses that compose said second lens group is formed with an aspheric surface including a term of an odd-numbered order.

13. The projection optical system according to claim 2, wherein at least one face of a lens or lenses that compose said fourth lens group is formed with an aspheric surface.

14. The projection optical system according to claim 2, wherein said fourth lens group includes at least one positive lens that satisfies conditional expressions (9) and (10):

$$0.7 < \Delta P < 6.0 \quad (9)$$

$$60 < \nu(\text{convex}) < 100 \quad (10)$$

where $$\Delta P = \{\Theta - (0.6444 - 0.001689 \cdot \nu(\text{convex}))\} \times 100$$

$$\Theta = (ng - nF)/(nF - nC)$$

where ν(convex) is the Abbe number of said positive lens at a d-line of a wavelength of 587.6 nm, ng is a refractive index of said positive lens at a g-line of a wavelength of 435.84 nm, nF is a refractive index of said positive lens at an F-line of a wavelength of 486.13 nm, and nC is a refractive index of said positive lens at a C-line of a wavelength of 656.28 nm.

15. The projection optical system according to claim 1, further comprising a light path bending unit interposed between said first and second lens groups or at a suitable position on the image side with respect to said second lens group for bending a light path.

16. The projection optical system according to claim 2, further comprising a light path bending unit interposed between said first and second lens groups or at a suitable position on the image side with respect to said second lens group for bending a light path.

17. An image projection apparatus, comprising:
an image formation section for forming an image; and
a projection optical system for projecting the image formed by said image formation section;
said projection optical system being of a retrofocus type that includes a first lens group having a negative refracting power and a second lens group having a negative refracting power, said first and second lens groups being arranged in order from a projection side, said first lens group including a negative meniscus lens that has a concave surface directed to a projection side and formed as an aspherical reflecting surface.

18. The image projection apparatus according to claim 17, wherein said projection optical system further includes a third lens group having a positive refracting power and a fourth lens group having a positive refracting power, said third and fourth lens groups being disposed in order toward an image side on the image side with respect to said second lens group, said first to fourth lens groups satisfying conditional expressions (1), (2), (3), (4) and (5):

$$0.02 < f(\text{all}) \cdot |\phi 1| < 0.3 \tag{1}$$

$$3.0 < \phi 12/\phi 34 < 20 \tag{2}$$

$$-2.0 < f(\text{all}) \cdot \phi 12 < -0.2 \tag{3}$$

$$0.1 < T\max/T0 < 5.0 \tag{4}$$

$$-30 < kr < 0 \tag{5}$$

where f(all) is a focal length of the image projection apparatus, $\phi 1$ is a refracting power of said first lens group, $\phi 2$ is a refracting power of said second lens group, $\phi 12$ the composite refracting power of said first and second lens groups, $\phi 34$ is a composite refracting power of said third and fourth lens groups, Tmax is a thickness of said negative meniscus lens at a maximum image height in a direction parallel to an optical axis, T0 is a thickness of said negative meniscus lens on the optical axis, and kr is a aspheric conical constant of said aspherical reflecting surface.

\* \* \* \* \*

UNITED STATES PATENT AND TRADEMARK OFFICE
CERTIFICATE OF CORRECTION

| | | |
|---|---|---|
| PATENT NO. | : 7,116,498 B2 | Page 1 of 1 |
| APPLICATION NO. | : 11/073973 | |
| DATED | : October 3, 2006 | |
| INVENTOR(S) | : Nishikawa et al. | |

It is certified that error appears in the above-identified patent and that said Letters Patent is hereby corrected as shown below:

In Column 11, Line 53, "TAS2:" should read --TASr:--
In Column 15, last line of Table 6, "-28164.26895" should read -- -29164.26895--
In Column 43, Line 47, "T0is" should read --T0 is--
In Column 46, Line 23, "T0is" should read --T0 is--

Signed and Sealed this

Nineteenth Day of June, 2007

JON W. DUDAS
*Director of the United States Patent and Trademark Office*